(12) United States Patent
Jeon et al.

(10) Patent No.: US 10,033,859 B2
(45) Date of Patent: Jul. 24, 2018

(54) MOBILE TERMINAL AND METHOD OF CONTROLLING SAME

(71) Applicant: LG ELECTRONICS INC., Seoul (KR)

(72) Inventors: Youjin Jeon, Seoul (KR); Byoungzoo Jeong, Seoul (KR); Yoonchan Won, Seoul (KR); Weonbog Bae, Seoul (KR); Youngjoon Kim, Seoul (KR); Jinhae Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/510,474

(22) PCT Filed: Aug. 28, 2015

(86) PCT No.: PCT/KR2015/009037
§ 371 (c)(1),
(2) Date: Mar. 10, 2017

(87) PCT Pub. No.: WO2016/039542
PCT Pub. Date: Mar. 17, 2016

(65) Prior Publication Data
US 2017/0264741 A1    Sep. 14, 2017

(30) Foreign Application Priority Data

Sep. 12, 2014  (KR) .................. 10-2014-0120911
Nov. 5, 2014   (KR) .................. 10-2014-0152958

(51) Int. Cl.
*H04M 3/42*   (2006.01)
*H04M 19/04*  (2006.01)

(52) U.S. Cl.
CPC ..... *H04M 3/42017* (2013.01); *H04M 19/047* (2013.01)

(58) Field of Classification Search
CPC ......... H04M 2/274558; H04M 19/047; H04M 3/42017; H04M 7/1295; H04M 1/72541;
(Continued)

(56) References Cited

U.S. PATENT DOCUMENTS

| 2004/0032946 A1* | 2/2004 | Koser ..................... H04M 3/02 379/373.01 |
| 2009/0225963 A1* | 9/2009 | Wang .................... H04M 19/04 379/88.19 |

(Continued)

FOREIGN PATENT DOCUMENTS

| KR | 10-0408563 B1  | 12/2003 |
| KR | 10-2005-0011263 A | 1/2005 |

(Continued)

*Primary Examiner* — Timothy Pham
(74) *Attorney, Agent, or Firm* — Birch, Stewart, Kolasch & Birch, LLP

(57) ABSTRACT

The present invention relates to a mobile terminal and a method of controlling same, and has the objective of providing a mobile terminal and a method of controlling same which allow a caller to be identified when a call signal is received without having to look at a display. The gist of the present invention is that when a call signal is received through a wireless communication unit, the calling phone number of the received call signal is identified, a melody bell sound corresponding to the identified calling phone number is output, and the key of the melody corresponds to a first number included in the calling phone number.

16 Claims, 16 Drawing Sheets

(58) Field of Classification Search
CPC .............. H04M 1/7258; H04M 19/04; H04M 1/274533; H04M 3/44; H04M 19/041; H04M 1/57; H04M 2207/12; H04M 2242/22; H04M 3/02; H04M 3/42051; H04M 3/42059; F01K 23/068
USPC ....................................................... 455/415
See application file for complete search history.

(56) References Cited

U.S. PATENT DOCUMENTS

2009/0225966 A1* 9/2009 Wang .................... H04M 19/04
 379/142.06
2017/0034330 A1* 2/2017 Zhang ............... H04M 1/72541

FOREIGN PATENT DOCUMENTS

| KR | 10-0650644 B1 | 11/2006 |
| KR | 10-1024470 B1 | 3/2011 |
| KR | 10-2012-0113547 A | 10/2012 |

* cited by examiner

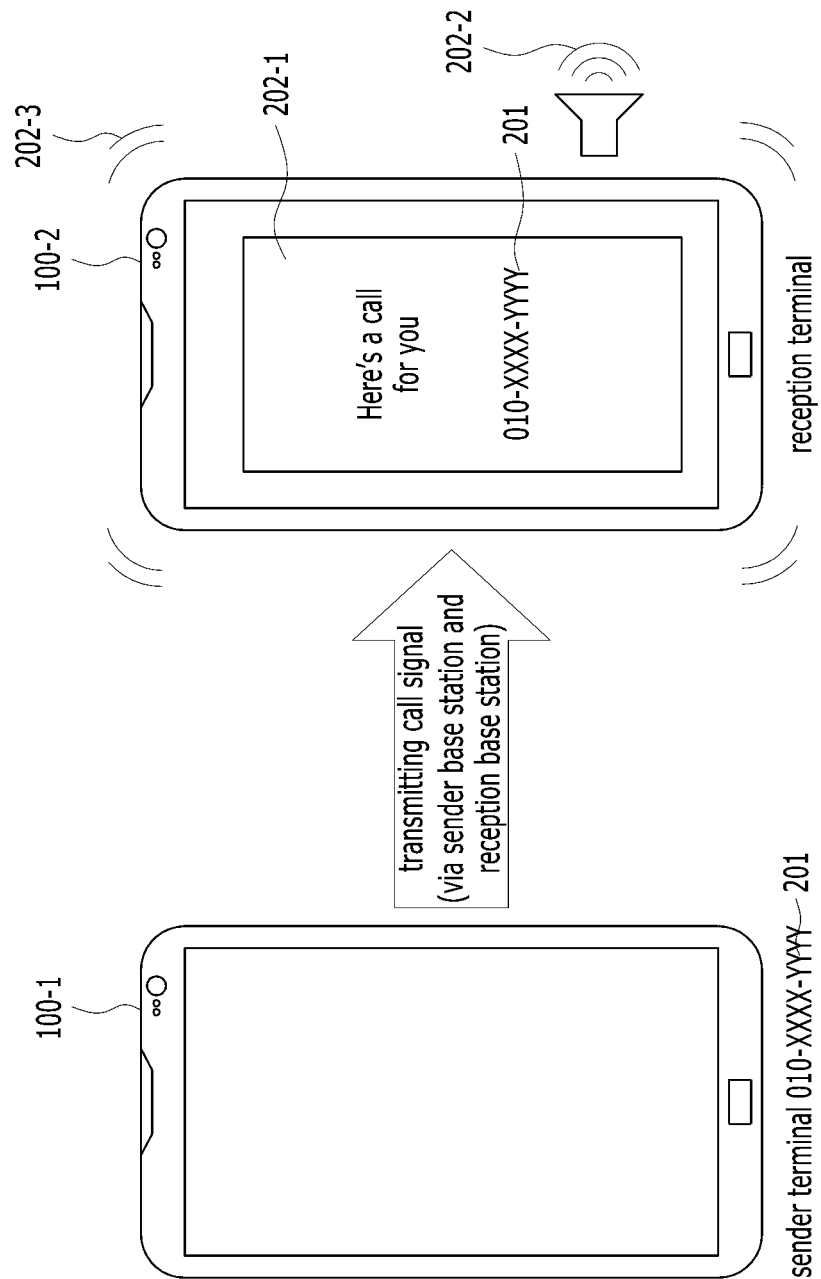

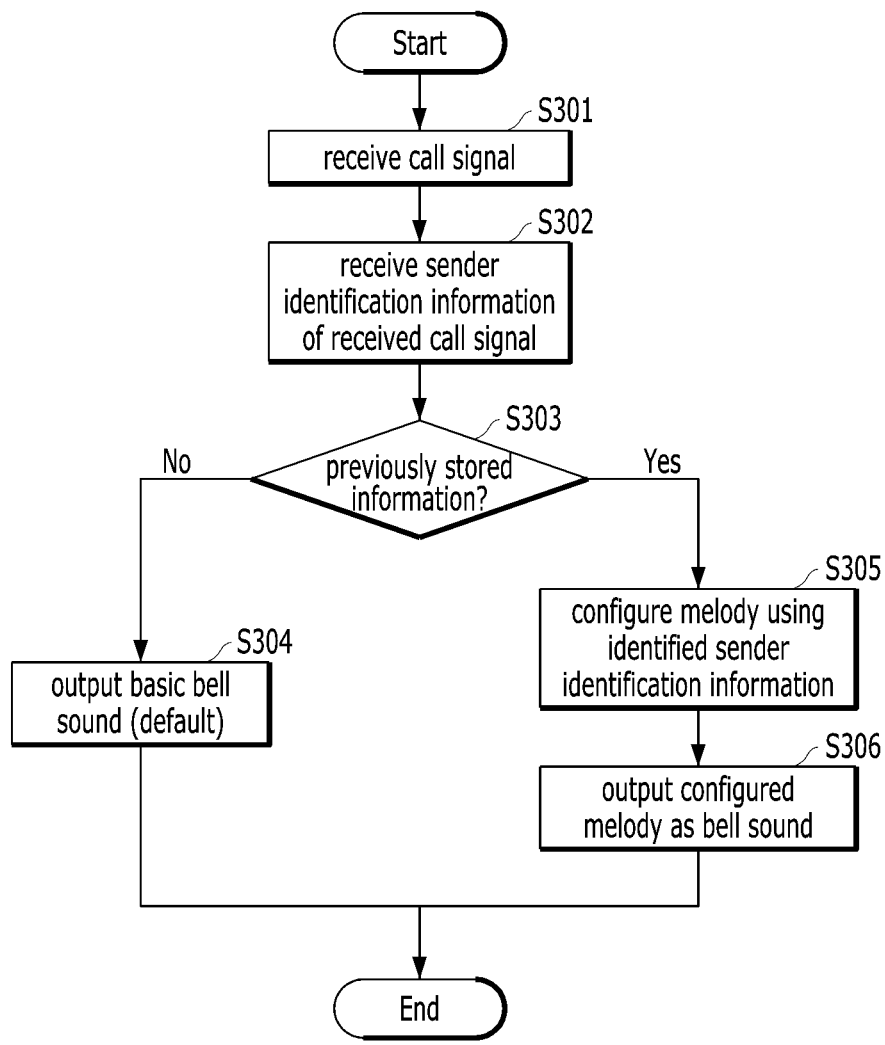

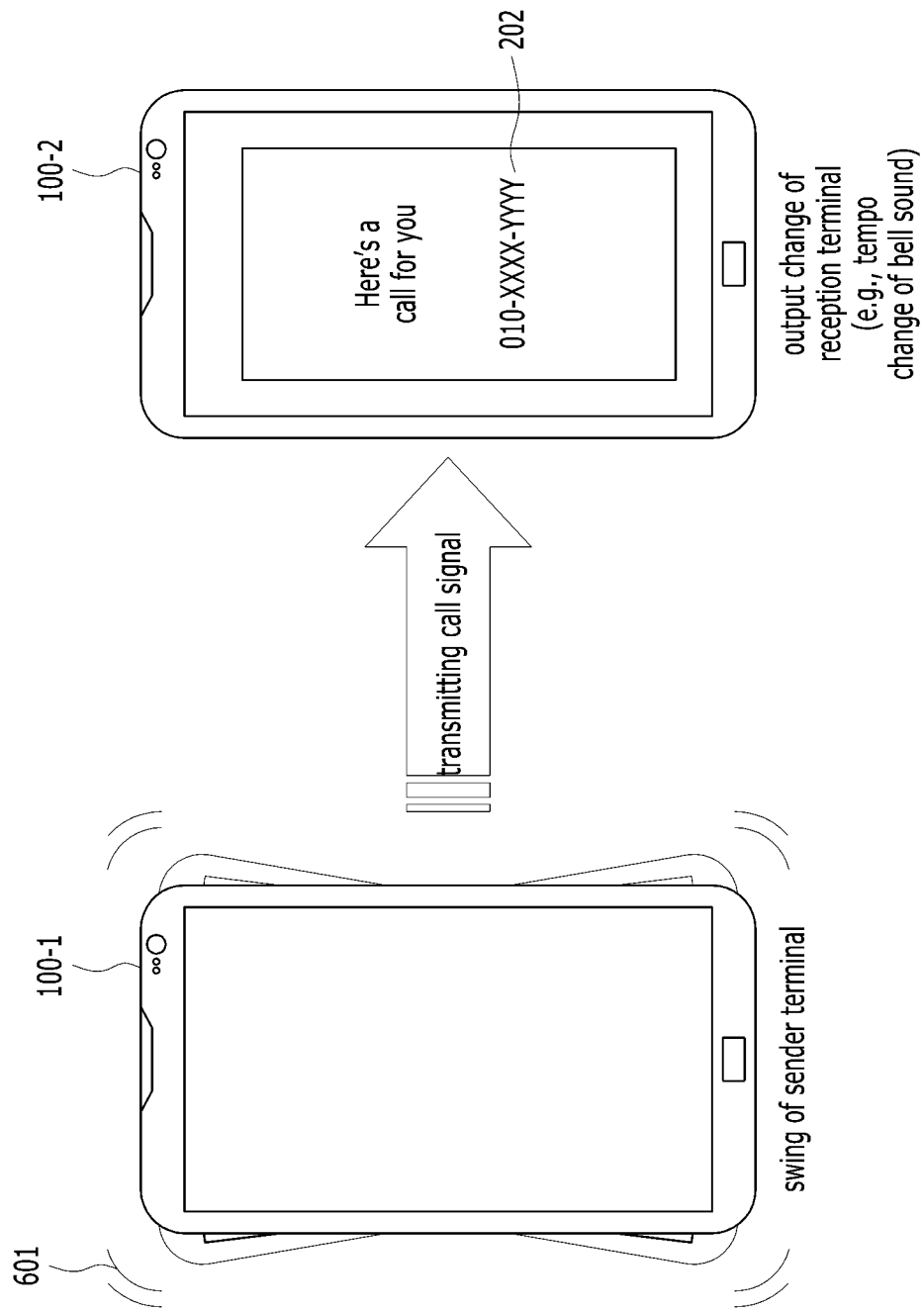

MOBILE TERMINAL AND METHOD OF CONTROLLING SAME

CROSS REFERENCE TO RELATED APPLICATIONS

This application is the National Phase of PCT International Application No. PCT/KR2015/009037, filed on Aug. 28, 2015, which claims priority under 35 U.S.C. 119(a) to Patent Application No. 10-2014-0120911, filed in Republic of Korea on Sep. 12, 2014 and Patent Application No. 10-2014-0152958, filed in Republic of Korea on Nov. 5, 2014, all of which are hereby expressly incorporated by reference into the present application.

TECHNICAL FIELD

The present invention relates to a mobile terminal and a method of controlling the same, in which user convenience may be more considered to implement use of the mobile terminal.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

In order to support and increase the diversified functions of the mobile terminal, it may be considered to improve a structural part and/or a software part of the mobile terminal.

The mobile terminal may receive a phone number of a sender from a base station and output the received phone number to a user when receiving a call signal. The user may determine whether to answer to the call signal by identifying the phone number of the sender, which is output through a display of the mobile terminal. In this way, if the call signal is received, since the user should identify information output through the display to identify the sender, a problem occurs in that the user cannot identify the sender without looking at the display of the mobile terminal. Therefore, studies for improving this problem will be required.

DISCLOSURE

Technical Problem

An object of the present invention is to solve the aforementioned problem and other problems. Another object of the present invention is to provide a mobile terminal and a method of controlling the same, in which a user may identify a sender of a call signal even without looking at a display when receiving the call signal.

Technical Solution

To achieve the above or other objects, according to one aspect of the present invention, a mobile terminal comprises a wireless communication unit; an output unit for outputting a bell sound; and a controller for outputting a bell sound, which includes a melody corresponding to a sender phone number of a call signal if the call signal is received through the wireless communication unit, wherein tonality of the melody corresponds to a first digit included in the sender phone number.

Also, in another aspect of the present invention, a control method of a mobile terminal comprises the steps of identifying a sender phone number of a call signal if the call signal is received through a wireless communication unit; and outputting a bell sound, which includes a melody corresponding to the identified sender phone number, wherein tonality of the melody corresponds to a first digit included in the sender phone number.

Advantageous Effects

Advantageous effects of a mobile terminal and a method of controlling the same according to the present invention are as follows.

According to at least one of the embodiments of the present invention, it is advantageous that a user may identify a sender of a call signal even without looking at a display.

Additional scope of applicability of the present invention will be apparent from the following detailed description. However, since various modifications and corrections may explicitly be understood by persons skilled in the art within spirits and scope of the present invention, the detailed description and a specific embodiment such as the preferred embodiment of the present invention should be understood to be only given as an example.

BRIEF DESCRIPTION OF THE DRAWINGS

FIG. 2 is a state view illustrating a control method for displaying identification information of a sender terminal in accordance with a general method.

FIG. 3 is a flow chart illustrating a control method for configuring and outputting a melody based on sender identification information in accordance with one embodiment of the present invention.

FIG. 6 is a view illustrating a control method for changing an output which indicates that a call signal is received, in accordance with one embodiment of the present invention.

BEST MODE FOR CARRYING OUT THE INVENTION

Figure 1A:
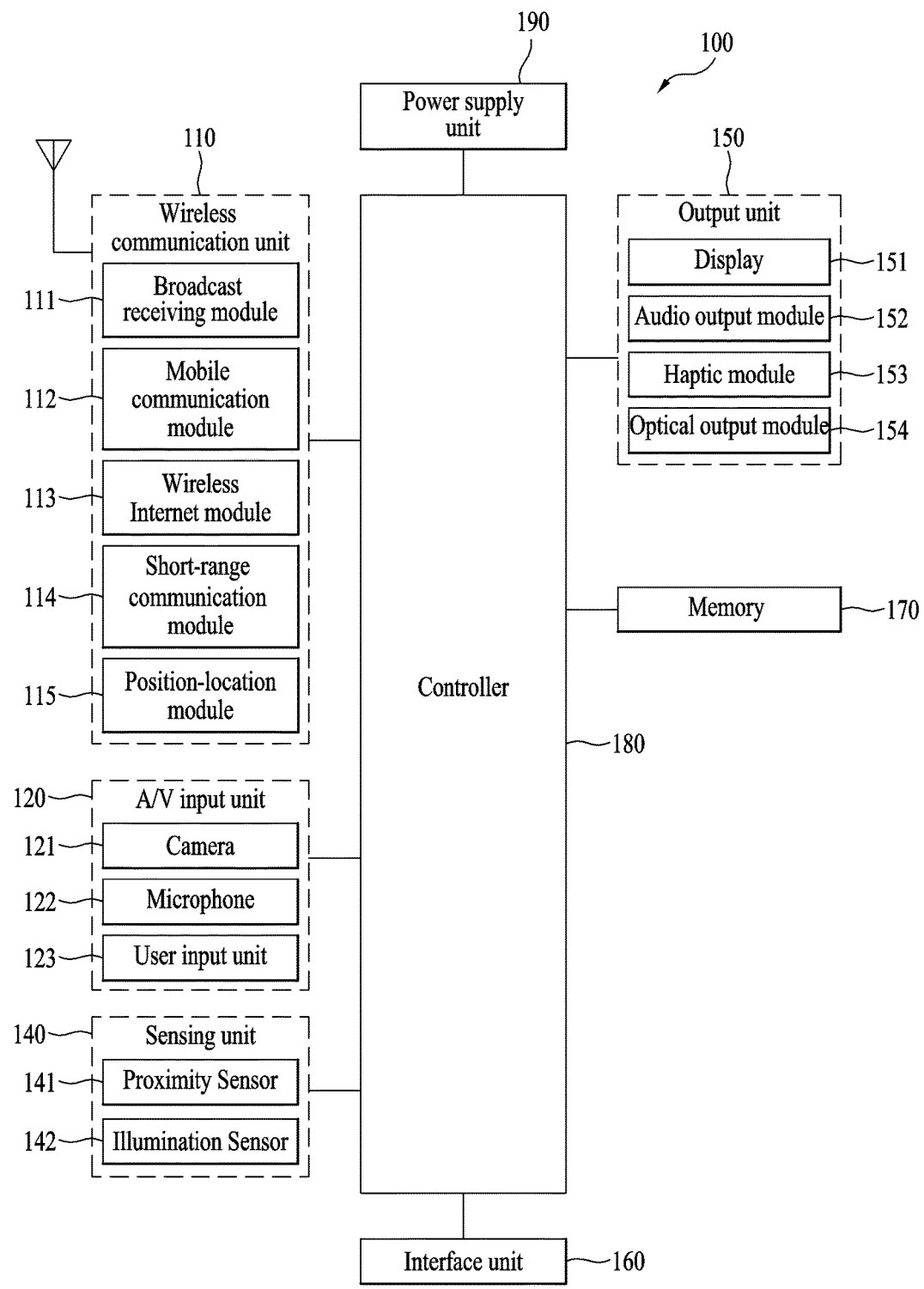
FIG. 1A is a block diagram of a mobile terminal according to the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

In this application, it is to be understood that the terms such as "include" and "has" are intended to designate that features, numbers, steps, operations, elements, parts, or their combination, which are disclosed in the specification, exist, and are intended not to previously exclude the presence or optional possibility of one or more other features, numbers, steps, operations, elements, parts, or their combinations.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
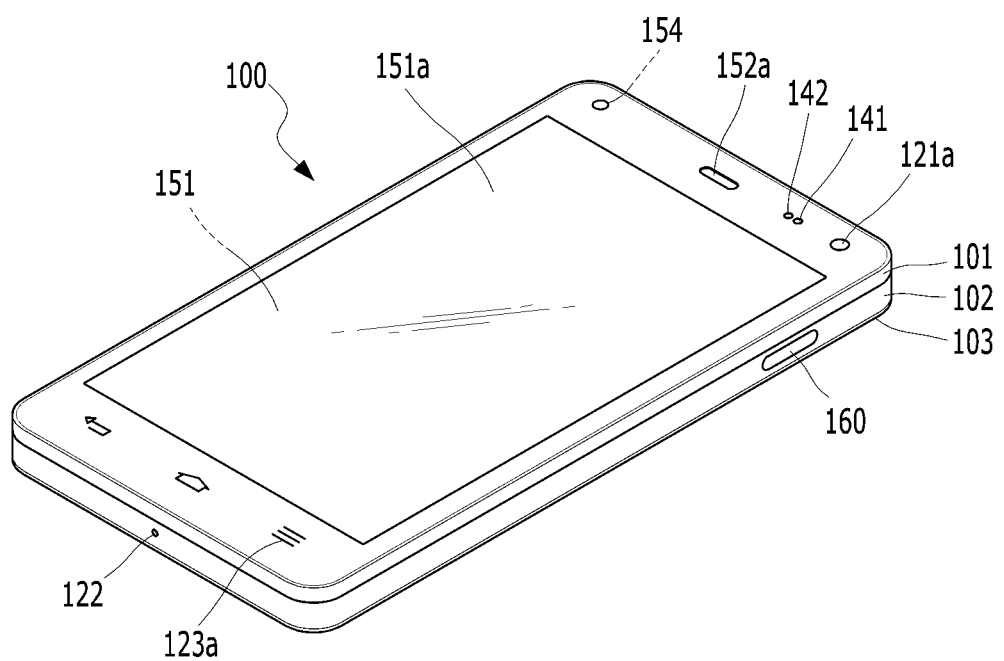
FIGS. 1B and 1C are conceptual views of one example of the mobile terminal, viewed from different directions.
Figure 1C:
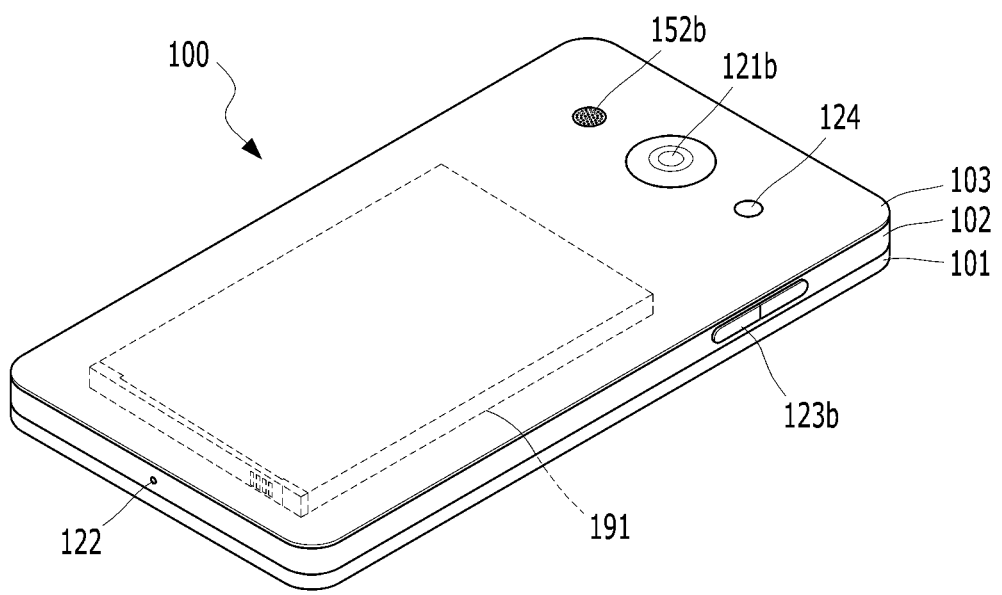

Reference is now made to FIGS. 1A to 1C, where FIG. 1A is a block diagram of a mobile terminal according to the present invention, and FIGS. 1B and 1C are conceptual views of one example of the mobile terminal, viewed from different directions.

The mobile terminal 100 may include a wireless communication unit 110, an input unit 120, a sensing unit 140, an output unit 150, an interface unit 160, a memory 170, a controller 180, and a power supply unit 190. It is understood that implementing all of the illustrated components in FIG. 1A is not a requirement, and that greater or fewer components may alternatively be implemented.

In more detail, the wireless communication unit 110 may include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may include one or more modules which connect the mobile terminal 100 to one or more networks.

The wireless communication unit 110 may include at least one of a broadcast receiving module 111, a mobile communication module 112, a wireless Internet module 113, a short-range communication module 114, and a location information module 115.

The input unit 120 may include a camera 121 or video input unit for video signal input, a microphone 122 or audio input unit for audio signal input, and a user input unit 123 (for example, a touch key, a push key, a mechanical key, and the like) for allowing a user to input information. Audio data or image data obtained by the input unit 120 may be analyzed and processed and processed by a control command of a user.

The sensing unit 140 may include one or more sensors configured to sense at least one of internal information of the mobile terminal, the surrounding environment of the mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, etc.), and a chemical sensor (for example, an electronic nose, a health care sensor, a biometric sensor, and the like). Meanwhile, the mobile terminal disclosed in this specification may be configured to utilize information sensed from at least two or more of the sensors.

The output unit 150 is configured to output various types of outputs related to audio, video, tactile output, and the like. The output unit 150 may include at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include at least one of wired or wireless headset ports, external power supply ports, wired or wireless data ports, memory card ports, ports for connecting a device having an identification module, audio input/output (I/O) ports, video I/O ports, and earphone ports. In some cases, the mobile terminal 100 may perform assorted control functions associated with a connected external device, in response to the external device being connected to the interface unit 160.

Also, the memory 170 stores data to support various functions of the mobile terminal 100. The memory 170 may be configured to store a plurality of application programs or applications executed in the mobile terminal 100 and data or instructions for operations of the mobile terminal 100. Some of these application programs may be downloaded from an external server via wireless communication. Other application programs may be installed within the mobile terminal 100 at time of manufacturing or shipping, which is the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 may control some or all of the components illustrated in FIG. 1A to execute the application programs stored in the memory 170. Moreover, the controller 180 may execute at least two or more of the components included in the mobile terminal 100 to execute the application programs.

The power supply unit 190 is configured to receive external power or internal power in order to supply appropriate power required for operating elements and components included in the mobile terminal 100 under the control of the controller 180. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with various embodiments which will be described hereinafter. Also, the operation, control or control method of the mobile terminal may be realized on the mobile terminal by driving of one or more application problems stored in the memory 170.

Hereinafter, the components listed as above will be described in more detail with reference to FIG. 1A prior to the various embodiments implemented through the mobile terminal 100.

First of all, the wireless communication unit 110 will be described. The broadcast receiving module 111 of the wireless communication unit 110 receives a broadcast signal and/or broadcast related information from an external broadcast management server through a broadcast channel. The broadcast channel may include a satellite channel and a terrestrial channel. For simultaneous broadcast reception or broadcast channel switching for at least two broadcast channels, two or more of the broadcast receiving module may be provided to the mobile terminal 100.

The mobile communication module 112 transmits and/or receives wireless signals to and from at least one of a base station, an external mobile terminal, and a server on a mobile communication network constructed in accordance with technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals may include audio call signals, video call signals, or various formats of data to support communication of text and multimedia messages.

The wireless Internet module 113 means a module for wireless Internet access. This module may be internally or externally coupled to the mobile terminal 100. The wireless Internet module 113 is configured to transmit and/or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, the wireless Internet module 113 performs such wireless Internet access through the mobile communication network. As such, the Internet module 113 may cooperate with, or function as, the mobile communication module 112.

The short-range communication module 114 is configured to facilitate short-range communications. Suitable technologies for implementing such short-range communications include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 may support wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks may be wireless personal area networks.

In some embodiments, another mobile terminal may be a wearable device (for example, a smart watch, a smart glasses or a head mounted display (HMD)), which is able to exchange data with the mobile terminal 100 according to the present invention. The short-range communication module 114 may sense (or recognize) the wearable device, which is capable of performing communication with the mobile terminal 100, in the periphery of the mobile terminal 100. Moreover, when the sensed wearable device is a device which is authenticated to communicate with the mobile terminal 100 according to the present invention, the controller 180, for example, may cause transmission of data processed in the mobile terminal 100 to the wearable device via the short-range communication module 114. Therefore, a user of the wearable device may use the data processed in the mobile terminal 100 through the wearable device. For example, when a call is received in the mobile terminal 100, the user may answer the call using the wearable device. Also, when a message is received in the mobile terminal 100, the user can check the received message using the wearable device.

The location information module 115 is a module for acquiring a position (or current position) of the mobile terminal. As an example, the location information module 115 includes a Global Position System (GPS) module or a Wi-Fi module. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function as any of the other modules of the wireless communication unit 110 to obtain data related to the position of the mobile terminal. The location information module 115 is a module used to acquire the position (or current position) of the mobile terminal, and is not limited to a module that directly calculates or acquires the position of the mobile terminal.

Next, the input unit 120 may be configured for input of video information (or signal), audio information (or signal), data, or information input from a user. For input of video information, the mobile terminal 100 may include one or a plurality of cameras 121. Such cameras 121 may process image frames of still pictures or moving video obtained by image sensors in a video call mode or image capture mode. The processed image frames can be displayed on the display unit 151 or stored in the memory 170. Meanwhile, the plurality of cameras 121 provided in the mobile terminal 100 may be arranged in a matrix configuration to permit a plurality of images having various angles or focal points to be input to the mobile terminal 100. Also, the plurality of cameras 121 may be located in a stereoscopic arrangement to acquire left and right images for implementing a stereoscopic image.

The microphone 122 processes an external audio signal to electric audio data. The processed audio data may be used in various manners according to a function (or application program) being executed in the mobile terminal 100. Meanwhile, the microphone 122 may include various noise removing algorithms to remove unwanted noise generated in the course of receiving the external audio signal.

The user input unit 123 is a component that permits input by a user. If information is input through the user input unit 123, the controller 180 may control the operation of the mobile terminal 100 to correspond to the input information. The user input unit 123 may include a mechanical input means (or a mechanical key, for example, a button located on a front and/or rear surface or a side surface of the mobile terminal 100, a dome switch, a jog wheel, a jog switch, and the like) and a touch-sensitive input means. As one example, the touch-sensitive input means may be a virtual key, a soft key or a visual key, which is displayed on a touch screen through software processing, or a touch key which is arranged on a location other than the touch screen. On the other hand, the virtual key or the visual key may be displayed on the touch screen in various shapes, for example, graphic, text, icon, video, or a combination thereof.

Meanwhile, the sensing unit 140 is configured to sense at least one of internal information of the mobile terminal, surrounding environment information of the mobile terminal, and user information, and generate sensing information corresponding to the sensed information. The controller 180 may control driving or operation of the mobile terminal 100 or perform a data processing, function or operation related to the application program installed in the mobile terminal, based on the sensed signal. Representative sensors of the various sensors that may be included in the sensing unit 140 will be described in more detail.

First of all, the proximity sensor 141 means a sensor that senses the presence or absence of an object approaching a predetermined detection surface or an object located near the surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of the object by changes of an electromagnetic field, which is responsive to an approach of an object with conductivity. In this case, the touch screen (or touch sensor) may also be categorized as a proximity sensor.

Meanwhile, for convenience of description, the term "proximity touch" will often be referred to herein to denote the scenario in which an object is positioned to be proximate to the touch screen without contacting the touch screen and recognized to be positioned on the touch screen. The term "contact touch" will often be referred to herein to denote the scenario in which an object makes physical contact with the touch screen. For the position corresponding to the proximity touch of the object on the touch screen, such position will correspond to a position where the object is perpendicular to the touch screen when the object corresponds to the proximity touch. The proximity sensor 141 may sense a proximity touch, and proximity touch patterns (for example, distance, direction, speed, time, position, moving status, and the like). Meanwhile, the controller 180 processes data (or information) corresponding to the proximity touch operation and proximity touch patterns sensed by the proximity sensor 141, and causes output of visual information corresponding to the processed data on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or touch input) applied to the touch screen (or display unit 151) by using at least one of a variety of touch methods such as a resistive type, a capacitive type, an infrared type, an ultrasonic type, and a magnetic field type.

As one example, the touch sensor may be configured to convert changes of pressure applied to a specific part of the touch screen, or convert capacitance occurring at the specific part of the touch screen, into electric input signals. The touch sensor may also be configured to sense a touched position of a touch object, which applies a touch to the touch screen, a touched area of the touch object, a touch pressure and/or touch capacitance. In this case, the touch object is generally used to apply a touch input to the touch sensor. Examples of the touch object include a finger, a touch pen, a stylus pen, a pointer, or the like.

In this way, when the touch input is sensed by the touch sensor, corresponding signal(s) is(are) transmitted to a touch controller. The touch controller processes the received signal(s), and then transmits corresponding data to the controller 180. Accordingly, the controller 180 may identify which region of the display unit 151 has been touched. In this case, the touch controller may be a component separate from the controller 180, or may be the controller 180.

Meanwhile, the controller 180 may execute the same or different controls according to a type of a touch object that touches the touch screen (or a touch key provided in addition to the touch screen). Whether to execute the same or different controls according to the type of the touch object may be decided based on a current operating state of the mobile terminal 100 or a currently executed application program.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, and a hovering touch.

The ultrasonic sensor may be implemented to recognize position information related to a sensing object by using ultrasonic waves. Meanwhile, the controller 180 may calculate a position of a wave generation source based on information sensed by the optical sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. In more detail, the position of the wave generation source may be calculated using the time difference from the time that the ultrasonic wave reaches the sensor based on the light as a reference signal.

Meanwhile, the camera 121 which is the component of the input unit 120 includes at least one of a camera sensor (e.g., CCD, CMOS, etc.), a photo sensor (or image sensors), and a laser sensor.

The camera 121 and the laser sensor may sense a touch of a sensing target for a 3D stereoscopic image in combination. The photo sensor may be laminated on the display device. The photo sensor is configured to scan movement of the sensing target in proximity to the touch screen. In more detail, the photo sensor may package photo diodes and transistors (TRs) at rows and columns to scan contents arranged on the photo sensor using an electric signal which changes according to the quantity of light to the photo diodes. Namely, the photo sensor may calculate the coordinates of the sensing target according to variation of light to thus obtain position information of the sensing target.

The display unit 151 displays (outputs) information processed in the mobile terminal 100. For example, the display unit 151 may display execution screen information of an application program executed in the mobile terminal 100 or user interface (UI) and graphic user interface (GUI) information based on the execution screen information.

Also, the display unit 151 may be configured as a stereoscopic display unit for displaying stereoscopic images.

The stereoscopic display unit may employ a 3D display scheme such as a stereoscopic display scheme (glasses scheme), an auto-stereoscopic scheme (glasses-free scheme), and a projection scheme (holographic scheme).

The audio output module 152 may output audio data received from the wireless communication unit 110 or stored in the memory 170 during a call signal reception mode, a call mode, a record mode, a voice recognition mode, or a broadcast reception mode. The audio output module 152 may output an audio signal related to a particular function (e.g., a call signal reception sound, a message reception sound, etc.) performed by the mobile terminal 100. The audio output module 152 may include a receiver, a speaker, a buzzer, or the like.

The haptic module 153 generates various tactile effects that a user may feel, perceive, or otherwise experience. A typical example of a tactile effect generated by the haptic module 153 may be vibration. The strength, pattern and the like of the vibration generated by the haptic module 153 may be controlled by user selection or setup of the controller. For example, the haptic module 153 may output different vibrations in a combining manner or a sequential manner.

Besides vibration, the haptic module 153 may generate various other tactile effects, including an effect by stimulation such as a pin arrangement vertically moving to a contact skin, a spray force or suction force of the air through a jet orifice or a suction opening, a touch to the skin, a contact of an electrode, electrostatic force, an effect by reproducing the sense of cold and warmth using an element that can absorb or generate heat, and the like.

The haptic module 153 may also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

The optical output module 154 outputs a signal for indicating occurrence of an event using light of a light source. Examples of the event generated in the mobile terminal 100 may include message reception, call signal reception, a missed call, an alarm, a schedule notice, an email reception, and information reception through an application.

A signal output by the optical output module 154 may be implemented in such a manner that the mobile terminal emits monochromatic light or light with a plurality of colors to a front or rear surface. The signal output may be terminated as the mobile terminal senses that a user has checked the generated event.

The interface unit 160 serves as an interface for all external devices to be connected with the mobile terminal 100. The interface unit 160 may receive data or power transmitted or supplied from an external device to transfer the received data or power to elements and components within the mobile terminal 100, or transmit internal data of the mobile terminal 100 to such external device. For example, the interface unit 160 may include wired or wireless headset ports, external power supply ports, wired or wireless data ports, memory card ports, ports for connecting a device having an identification module, audio input/output (I/O) ports, video I/O ports, and earphone ports.

Meanwhile, the identification module may be a chip that stores various kinds of information for authenticating the authority of using the mobile terminal 100 and may include a user identity module (UIM), a subscriber identity module (SIM), a universal subscriber identity module (USIM), and the like. In addition, the device having the identification module (also, referred to as an "identifying device") may be manufactured in the form of a smart card. Accordingly, the identifying device can be connected with the terminal 100 via the interface unit 160.

Also, when the mobile terminal 100 is connected with an external cradle, the interface unit 160 may serve as a passage to allow the power from the cradle to be supplied to the mobile terminal 100 or may serve as a passage to allow various command signals input by the user from the cradle to be transferred to the mobile terminal 100. The various command signals or power input from the cradle may operate as signals for recognizing that the mobile terminal is accurately mounted on the cradle.

The memory 170 may store programs to support operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one or more types of storage mediums including a Flash memory, a hard disk, a solid state disk (SSD), a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. The mobile terminal 100 may be operated in relation to a web storage device that performs the storage function of the memory 170 over a network, such as the Internet.

Meanwhile, as described above, the controller 180 typically controls the operation related to the application program and the overall operations of the mobile terminal 100. For example, the controller 180 may set or release a lock state for restricting a user from inputting a control command with respect to applications when a status of the mobile terminal meets a preset condition.

Also, the controller 180 may perform the controlling and processing associated with voice calls, data communications, video calls, and the like, or perform pattern recognition processing to recognize a handwriting input or a picture drawing input performed on the touch screen as texts or images, respectively. In addition, the controller 180 may control one or a combination of the above-described components in order to implement various exemplary embodiments disclosed herein on the mobile terminal 100 according to the present invention.

The power supply unit 190 receives external power or internal power under the control of the controller 180 and supply the appropriate power required for operating the respective elements and components included in the mobile terminal 100. The power supply unit 190 may include a battery, which is typically rechargeable or may be detachably coupled to the terminal body for charging.

Also, the power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this case, the power supply unit 190 may receive power, which is transferred from an external wireless power transmitter, using at least one of an inductive coupling method based on magnetic induction or a magnetic resonance coupling method based on electromagnetic resonance.

Meanwhile, various embodiments described herein may be implemented in a computer-readable medium, or similar medium using, for example, software, hardware, or any combination thereof.

Referring now to FIGS. 1B and 1C, the mobile terminal 100 is provided with a bar-type terminal body. However, the mobile terminal 100 may be applied to various structures such as a watch-type, a clip-type, a glasses-type, a folder-type, a flip-type, a slide-type, swing-type, and a swivel-type without limitation to the bar-type. In case of the folder-type, slide-type, swing-type and swivel-type, two and more bodies are combined with each other in a relatively movable manner. Although discussion herein will often relate to a particular type of the mobile terminal, such teachings with regard to a particular type of the mobile terminal may generally apply to other types of mobile terminals as well.

In this case, the terminal body may be understood as the mobile terminal 100 which is regarded as at least one assembly.

The mobile terminal 100 includes a case (for example, frame, housing, cover, and the like) forming the appearance of the terminal. As shown, the mobile terminal 100 may include a front case 101 and a rear case 102. Various electronic components are incorporated into a space formed by coupling between the front case 101 and the rear case 102. At least one middle case may be additionally arranged between the front case 101 and the rear case 102.

The display unit 151 may be arranged on the front surface of the terminal body to output information. As shown, a window 151a of the display unit 151 may be mounted to the front case 101 to form the front surface of the terminal body together with the front case 101.

In some cases, electronic components may also be mounted to the rear case 102. Examples of such electronic components include a detachable battery, an identification module, and a memory card. A rear cover 103 for covering the electronic components may be detachably coupled to the rear case 102. Therefore, when the rear cover 103 is detached from the rear case 102, the electronic components mounted to the rear case 102 are externally exposed.

As shown, when the rear cover 103 is coupled to the rear case 102, a side surface of the rear case 102 may partially be exposed. In some cases, upon the coupling, the rear case 102 may be completely covered by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating various electronic components, the mobile terminal 100 may be configured such that one case forms the inner space. In this case, a mobile terminal 100 having a uni-body may be implemented in such a manner that synthetic resin or metal extends from a side surface to a rear surface.

Meanwhile, the mobile terminal 100 may include a waterproofing unit (not shown) for preventing introduction of water into the terminal body. For example, the waterproofing unit may include a waterproofing member which is provided between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 142, an optical output module 154, first and second cameras 121a and 121b, first and second manipulation units 123a and 123b, a microphone 122, and an interface unit 160.

Hereinafter, as shown in FIGS. 1B and 1C, the display unit 151, the first audio output module 152a, the proximity sensor 141, the illumination sensor 142, the optical output module 154, the first camera 121a and the first manipulation unit 123a are arranged on the front surface of the terminal body, the second manipulation unit 123b, the microphone 122 and the interface unit 160 are arranged at a side of the terminal body, and the second audio output module 152b and the second camera 121b are arranged on the rear surface of the terminal body.

However, it is to be understood that alternative arrangements are possible and within the teachings of the instant disclosure. Some components may be omitted, replaced or rearranged. For example, the first manipulation unit 123a may not be provided on the front surface of the terminal body, and the second audio output module 152b may be provided at the side of the terminal body not the rear surface of the terminal body.

The display unit 151 displays (outputs) information processed in the mobile terminal 100. For example, the display unit 151 may display execution screen information of an application program executed in the mobile terminal 100 or user interface (UI) and graphic user interface (GUI) information based on the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

Also, two or more display units 151 may exist in accordance with an implementation type of the mobile terminal 100. In this case, a plurality of the display units 151 may be arranged on one surface in a single body or to be spaced apart from each other, or these display units may be arranged on different surfaces.

The display unit 151 may also include a touch sensor which senses a touch input for the display unit 15, whereby a control command may be input by a touch manner. When a touch is input to the display unit 151, the touch sensor may be configured to sense the touch and the controller 180 may be configured to generate a control command corresponding to the touch. The content which is input in the touch manner may be a text or numerical value, or a menu item which can be indicated or designated in various modes.

The touch sensor may be configured in the form of a film having a touch pattern, disposed between the window 151a and a display (not shown) on a rear surface of the window 151a, or a metal wire which is patterned directly on the rear surface of the window 151a. Alternatively, the touch sensor may be formed in a single body with the display. For example, the touch sensor may be disposed on a substrate of the display or within the display.

The display unit 151 may also form a touch screen together with the touch sensor. In this case, the touch screen may serve as the user input unit 123 (see FIG. 1A). As the case may be, the touch screen may replace at least some of the functions of the first manipulation unit 123a.

The first audio output module 152a may be implemented in the form of a receiver to transfer a call sound to ears of a user, and the second audio output module 152b may be implemented in the form of a loud speaker to output various alarm sounds or multimedia audio reproduction.

The window 151a of the display unit 151 may include an aperture to permit sound generated by the first audio output module 152a to pass. However, the present invention is not limited to this configuration, and the sound may be configured to be released along an assembly gap between the structural bodies (for example, a gap between the window 151a and the front case 101). In this case, a hole independently formed to output audio sounds may not be seen or is otherwise hidden in terms of appearance, thereby further simplifying the appearance of the mobile terminal 100.

The optical output module 154 is configured to output light for indicating occurrence of an event. Examples of the event include a message reception, a call signal reception, a missed call, an alarm, a schedule notice, an email reception, information reception through an application. When a user has checked the event, the controller can control the optical output unit 154 to stop the light output.

The first camera 121a processes image frames of still or moving images obtained by the image sensor in a capture mode or a video call mode. The processed image frames may be displayed on the display unit 151 or stored in the memory 170.

The first and second manipulation units 123a and 123b are examples of the user input unit 123 which is manipulated by a user to receive a command for controlling the operation of the mobile terminal 100. The first and second manipulation units 123a and 123b may also be commonly referred to as a manipulating portion, and may employ any tactile manner that allows the user to perform manipulation such as touch, push, scroll, or the like. The first and second manipulation units 123a and 123b may also employ any non-tactile manner that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received by the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be arranged on the rear surface of the terminal body. The rear input unit is manipulated by the user to provide an input to control the operation of the mobile terminal 100. The input may be used in various ways. For example, the rear input unit may be used by the user to provide an input for a command, such as power on/off, start, end, and scroll, and an input for a command to control a volume level being output from the first or second audio output modules 152a or 152b and switch to a touch recognition mode of the display unit 151. The rear input unit may be configured to permit a touch input, a push input, or combinations thereof.

The rear input unit may be arranged to overlap the display unit 151 of the front surface in a thickness direction of the terminal body. As one example, the rear input unit may be arranged on an upper end portion of the rear surface of the terminal body such that a user can easily manipulate it using a forefinger when the user grabs the terminal body with one hand. However, the arrangement of the rear input unit is not limited to the above example, and modifications may be made in the arrangement of the rear input unit.

When the rear input unit is provided on the rear surface of the terminal body, a new type user interface may be implemented using the rear input unit. Also, the above-described touch screen or rear input unit may replace some or all of the functions of the first manipulation unit 123a provided on the front surface of the terminal body. As such, in situations where the first manipulation unit 123a is omitted from the front surface of the terminal body, the display unit 151 may be configured to have a larger screen.

Meanwhile, the mobile terminal 100 may include a finger scan sensor which scans a user's fingerprint. The controller 180 may then use fingerprint information sensed by the finger scan sensor as a part of an authentication procedure. The finger scan sensor may also be installed in the display unit 151 or the user input unit 123.

The microphone 122 is configured to receive a user's voice and other sounds. The microphone 122 may be provided at a plurality of places and thus configured to receive stereo sound.

The interface unit 160 may serve as a passage that allows the mobile terminal 100 to interface with external devices. For example, the interface unit 160 may include at least one of a connection terminal for connecting to another device (for example, an earphone and an external speaker), a port for near field communication (for example, an Infrared Data Association (IrDA) port, a Bluetooth port, and a wireless LAN port), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be arranged at the rear surface of the terminal body. In this case, the second camera 121b has an image capturing direction that is substantially opposite to the image capturing direction of the first camera unit 121a.

The second camera 121a may include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses, and images with better qualities may be acquired.

A flash 124 may be arranged to adjoin the second camera 121b. When an image of a subject is captured with the camera 121b, the flash 124 may illuminate the subject.

The second audio output module 152b may additionally be arranged on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed in the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material may be configured to serve as the antenna.

The power supply unit 190 (see FIG. 1A) for supplying power to the mobile terminal 100 is provided on the terminal body. The power supply unit 190 may be installed in the terminal body, or may include a battery 191, which is configured to be detachably coupled to an outside of the terminal body.

The battery 191 may be configured to receive power via a power source cable connected to the interface unit 160. Also, the battery 191 may be configured to be recharged in a wireless manner using a wireless charger. Wireless charging may be implemented by magnetic induction or resonance manner (electromagnetic resonance).

Meanwhile, the rear cover 103 is shown coupled to the rear case 102 for shielding the battery 191, to prevent separation of the battery 191 and protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 may also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, embodiments related to a control method that may be implemented in the mobile terminal configured as above will be described with reference to the accompanying drawings. It will be apparent to the person with ordinary skill in the art that the present invention may be embodied in other specific forms within the range that does not depart from spirits and indispensable features of the present invention.

FIG. 2 is a state view illustrating a control method for displaying identification information of a sender terminal in accordance with a general method.

In the following drawings and detailed description for describing the embodiments of the present invention, a sender side mobile terminal 100-1 (hereinafter, referred to as a sender terminal) for sending a call signal and a reception side mobile terminal 100-2 (hereinafter, referred to as a reception terminal) are shown respectively and will be described, to simply identify the sender side from the reception side.

Referring to FIG. 2, the sender terminal 100-1 having a sender phone number 201 transmits a call signal to the reception terminal 100-2. In this case, it will be apparent that the call signal may be transmitted from the sender terminal 100-1 to the reception terminal 100-2 through a sending base station and a receiving base station.

Generally, if the reception terminal 100-2 receives a call signal, the reception terminal 100-2 outputs a phone number of a sender party through its display unit. This output will be described in detail with reference to FIG. 2.

If a call signal is received from the sender terminal 100-1, the reception terminal 100-2 may output a notice pop-up window 202-1 together with a bell sound output 202-2 or vibration output 202-3 to indicate that the call signal is being received. The notice pop-up window 202-1 output in response to reception of the call signal may include a phone number 201 of the sender terminal.

However, if a user cannot check the display unit 151, a problem occurs in that the user cannot identify the sender party even in the case that a sender party phone number is output on the display unit 151. For example, there may be a situation that the user holds things with both hands and the mobile terminal 100 is kept in a pocket of the user. As another example, there may be a situation that the user should hold a steering wheel or gear rod of a car with both hands when the user drives a car. Under the situation, since the user cannot check the display unit 151 even though the sender party phone number is being output through the display unit 151, the user cannot identify the sender party.

That is, since the above-described method depends on a restrictive output such as the display unit 151, it may be restrictive to transfer information on the sender party identified by the user under various situations.

Therefore, one embodiment of the present invention suggests to transfer information on the sender party to the user through another output type other than the output type such as the display unit 151. The information on the sender party may include a phone number of the sender party in the embodiment, which will be described later.

FIG. 3 is a flow chart illustrating a control method for configuring and outputting a melody based on sender identification information in accordance with one embodiment of the present invention.

In one embodiment of the present invention, it is suggested that a melody is configured based on sender identification information during reception of a call signal. In this case, the sender identification information may include a sender phone number.

For example, the reception terminal 100-2 may configure a melody by using numbers included in the sender phone number and output the configured melody as a bell sound for indicating the call signal. Through this method, the user may identify the sender party by using the corresponding bell sound. The other party corresponding to the corresponding bell sound may be specified even though the user cannot identify the sender phone number by hearing the bell sound.

Hereinafter, the control method described with reference to FIG. 3 will be based on the operation at the reception terminal 100-2.

In step S301, the controller 180 of the reception terminal 100-2 receives a call signal from the sender terminal 100-1. Subsequently, in step S302, the controller 180 may receive identification information (sender identification information) of the sender terminal 100-1.

In step S303, the controller 180 determines whether the identified sender phone number is previously stored in the memory 170. For example, the reception terminal 100-2 determines whether the sender phone number exist in the phone numbers previously stored in a contact list. As a result, if the sender phone number is not previously stored in the memory 170, the current step may proceed to step S304, and if the sender phone number is previously stored in the memory 170, the current step may proceed to step S305.

In step S304, the controller 180 may output a basic bell sound and end the flow chart. That is, the reception terminal 100-2 outputs the basic bell sound only during reception of the call signal from the other party who is not previously stored in the contact list.

In step S305, the controller 180 configures a melody based on the sender identification information received in the step S302. The method for configuring a melody will be described in detail with reference to FIGS. 4 and 5A.

In step S306, the configured melody may be output as a bell sound for the received call signal and the flow chart may end.

That is, in one embodiment of the present invention, it is advantageous that the bell sound is output differently depending on the sender party and thus the user of the reception terminal 100-2 may easily identify the sender party by hearing the bell sound only.

In this way, to output the bell sound differently, various methods may exist. For example, there may be a method for setting a bell sound per phone number listed in the contact list. However, according to this method, inconvenience occurs in that the user should set the bell sound per phone number. Therefore, in one embodiment of the present invention, it is suggested that a melody is automatically generated based on the sender identification information and the generated melody is output as a bell sound. Hereinafter, a detailed example of this method will be described with reference to FIGS. 4 and 5A.

Figure 4:
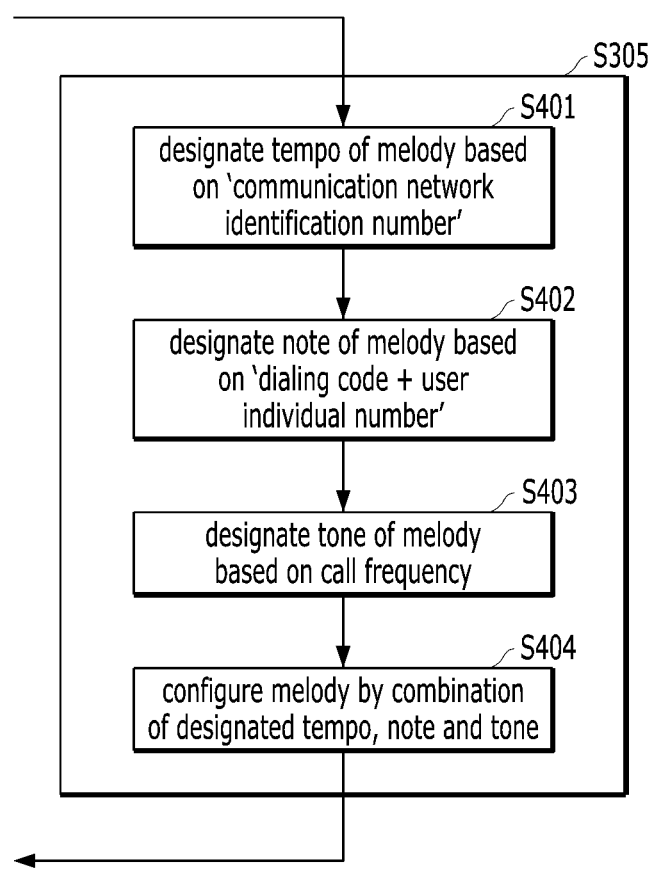
FIG. 4 is a flow chart illustrating a control method for generating a melody based on sender identification information in accordance with one embodiment of the present invention.
Figure 5A:
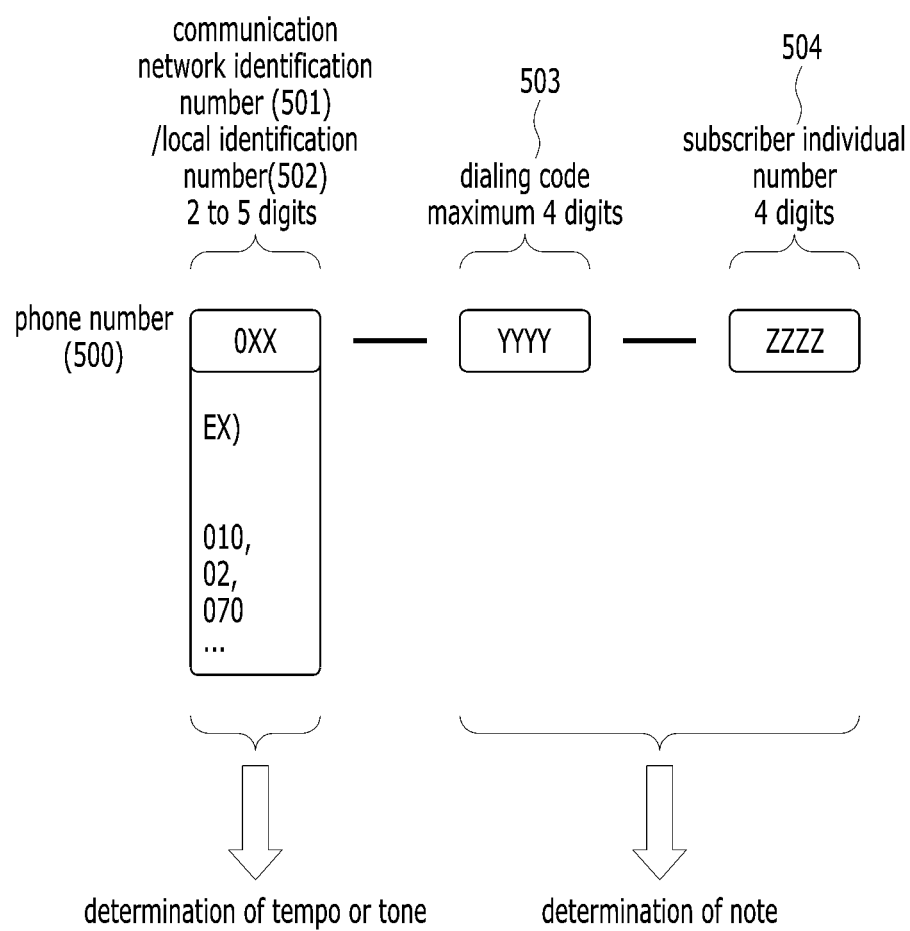
FIG. 5A is a view illustrating an example of a sender phone number structure for describing one embodiment of the present invention.

FIG. 4 is a flow chart illustrating a control method for generating a melody based on sender identification information in accordance with one embodiment of the present invention. FIG. 5A is a view illustrating an example of a sender phone number structure for describing one embodiment of the present invention.

In one embodiment of the present invention described in FIGS. 4 and 5A, a control method for generating a melody using a sender phone number included in sender identification information will be described as an example. However, the method for using a sender phone number of the sender identification information is only exemplary. That is, the embodiments of the present invention may be applied to the control method for identifying the sender party by using the sender identification information and outputting a melody corresponding to the identified sender party.

The phone number structure may be varied depending on countries which use the corresponding phone number. The Korean phone number system is prescribed in accordance with the second chapter of telecommunication number management rules noticed by Korea Communications Commission. An example of the Korean phone number shown in FIG. 5A is classified into three areas, each of which includes a communication network identification number 501/local identification number 502, a dialing code 503 and a subscriber individual number 504, using a symbol '-'.

The communication network identification number 501 means a number comprised of three digits for identifying a mobile communication provider subscribed by the mobile terminal, and "010", "011", "016", etc. are used as the communication network identification number 501 in Korea. The communication network identification number is arranged at the first part of the phone number as shown in FIG. 5A.

The local identification number 502 means a number comprised of two digits or three digits for identifying a local area where a wire telephone is used. The local identification number is arranged at the first part of the phone number in the same manner as the communication network identification number 501.

The dialing code 503 means a number for indicating an office name of a telephone exchange office, and may be classified per usage of the number. The dialing code 503 may be comprised of maximum four digits, and is arranged next to the communication network identification number 501/local identification number 502 on the phone number.

Finally, the subscriber individual number 504 means a number of four digits selected by the subscriber who has subscribed mobile communication or wire telephone or a number of four digits randomly given. The subscriber individual number 504 also means a digit given to identify phone numbers having the same dialing code.

Since the phone number structure is only exemplary, one embodiment of the present invention is not limited to this phone number structure. That is, one embodiment of the present invention may be applied to various phone number structures classified per country, usage and communication method.

That is, the phone number may be classified into a plurality of digit strings depending on the role as described above. In the example of the aforementioned phone number structure, the communication network identification number 501/local identification number 502, the dialing code 503 and the subscriber individual number 504 may be first to third digit strings, respectively.

In one embodiment of the present invention, it is suggested that the melody is configured using the phone number structure classified as above. At least one of determination of a note, determination of a tempo and determination of a tone, which are required to configure the melody, may be used as the digit string. For example, the first digit string may be used to determine a tempo of the melody, and the second digit string may be used to determine a tone of the melody.

In describing the embodiment of FIG. 4, the tempo may be determined using the communication network identification number 501 which is the first digit string, and the tone may be determined using the second and third digit strings (dialing code 503 and subscriber individual number 504). However, the embodiment of FIG. 4 is only exemplary.

In step S401, the controller 180 may set a tempo of the melody on the basis of the dialing code 503 and the user individual number 504.

In step S402, the controller 180 may designate a note of the melody on the basis of the dialing code 503 and the user individual number 504. In this case, the dialing code and the subscriber individual number are comprised of a plurality of digits, and the controller 180 may designate notes for configuring the melody as notes corresponding to each of the plurality of digits. The following Table 1 is an example for allowing each note to correspond to each digit.

TABLE 1

| Digit | Corresponding note |
|---|---|
| 0 | do |
| 1 | do# |
| 2 | re |
| 3 | re# |
| 4 | mi |
| 5 | fa |
| 6 | fa# |
| 7 | sol |
| 8 | sol# |
| 9 | la |

For example, it is assumed that the dialing code 503 of the sender phone number is "4132" and the subscriber individual number 504 is "9586". In this case, the sound for configuring the melody may be comprised of "Mi-Do#-Re#-Re-La-Fa-Sol#-Fa#". In one embodiment of the present invention, the notes may correspond to the digits included in the dialing code 503 and the subscriber individual number 504 in due order.

Moreover, in one embodiment of the present invention, it is suggested that the tone of the melody is varied to identify the sender phone number when the sender phone number is a frequently transmitted and received number (that is, phone number having high use frequency).

In step S403, the controller 180 may determine the tone of the melody on the basis of call frequency with the sender phone number. The tone is a sensible feature of a note generated due to a difference in components that configure the note, and may be varied depending on a sounding body or vibration method, which configures the note, regardless of the height or size of the note. For example, since there is a difference between a note "Do" made by a piano and a note "Do" made by a violin, these notes may be regarded to have tones different from each other.

In the step S403 according to one embodiment of the present invention, the controller 180 may change the tone of the melody from a basic tone to another tone when the ranking of call frequency of the corresponding sender phone number is included in a predetermined grade.

Alternatively, in another embodiment of the present invention, the melody may be configured to have different tones per ranking of call frequency.

In step S403, the controller 180 may configure (generate) the melody by using the tempo, the note and the tone, which are designated in the aforementioned steps.

That is, according to the aforementioned embodiment through FIGS. 3 to 5A, it is advantageous that the reception terminal 100-2, which receives the call signal, may transfer information on the sender terminal 100-1 to the user as audio output by identifying the sender terminal 100-1 and outputting the melody corresponding to the identified sender terminal 100-1.

Meanwhile, in another embodiment of the present invention, it is suggested that a vibration pattern is changed based on other party identification information. This embodiment will be described with reference to FIG. 5B.

Figure 5B:
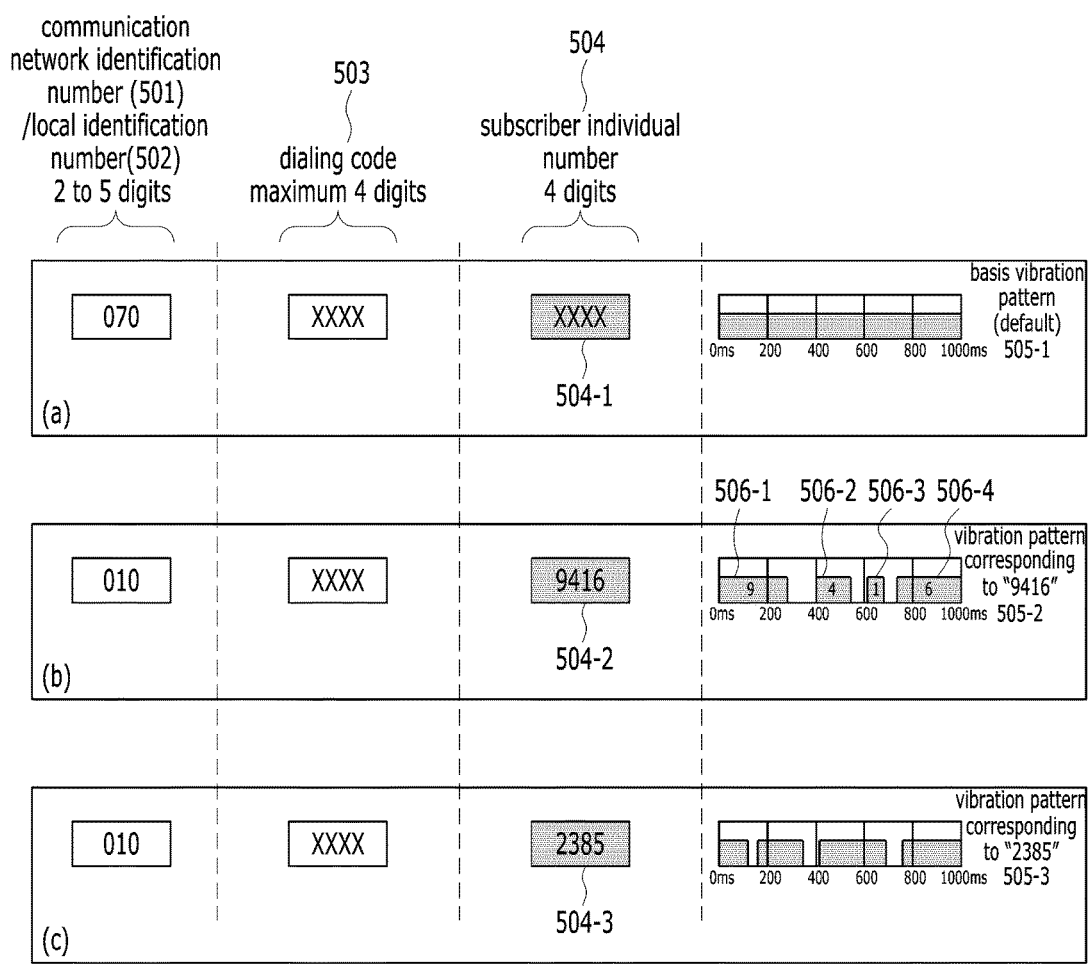
FIG. 5B is a view illustrating a control method for controlling a vibration pattern using a phone number structure in accordance with one embodiment of the present invention.

FIG. 5B is a view illustrating a control method for controlling a vibration pattern using a phone number structure in accordance with one embodiment of the present invention.

In one embodiment of the present invention, it is suggested that the vibration pattern is changed using at least one of a plurality of digit strings that configure a phone number. In the example described with reference to FIG. 5B, it is suggested to change the vibration pattern by using the subscriber individual number 504. However, without limitation to this example, the communication network identification number 501, the local identification number 502, the dialing code 503 or a combination thereof may be used.

The controller 180 according to one embodiment of the present invention may output a basis vibration pattern 505-1 as shown in FIG. 5B(a) if the sender phone number is not previously stored in the memory 170. Also, the controller 180 according to one embodiment of the present invention may output a vibration pattern corresponding to the subscriber individual number 504 to correspond to reception of a call signal if the sender phone number is previously stored in the memory 170.

That is, according to the above-described embodiment, the user may identify the sender party through the vibration pattern which is output.

For example, when the subscriber individual number 504-2 of the sender phone number is "9416" as shown in FIG. 5B(b), the controller 180 may output a vibration pattern 505-2 corresponding to "9416". In this case, a plurality of vibrations 506-1 to 506-4, which configure the vibration pattern, may respectively correspond to a subscriber individual number 504-2. A duration of each vibration may be proportional to a corresponding digit. That is, the vibration 506-1 corresponding to a digit "9" may have a duration proportional to "9".

Likewise, when the subscriber individual number 504-3 of the sender phone number is "2385" as shown in FIG. 5B(c), the controller 180 may output a vibration pattern 505-3 corresponding to "2385".

Moreover, in one embodiment of the present invention, it is intended to further suggest a control method for changing the output of the reception terminal 100-2 through a predetermined command received in the sender terminal 100-1 while the call signal is being transferred. This embodiment will be described with reference to FIG. 6.

FIG. 6 is a view illustrating a control method for changing an output which indicates that a call signal is received, in accordance with one embodiment of the present invention.

The user of the sender terminal 100-1 may push the user of the reception terminal 100-2 to quickly answer to the call signal if the user of the reception terminal 100-2 does not answer to the call signal. Therefore, in one embodiment of the present invention, it is suggested to change a notice manner of the call signal output from the reception terminal 100-2. For example, there may be a method for changing a tempo of a bell sound output from the reception terminal 100-2.

Referring to FIG. 6, the sender terminal 100-1 transmits the call signal to the reception terminal 100-2. In this case, as described above, the reception terminal 100-2 may notify the user of the reception terminal 100-2 that the call signal is being received, by outputting at least one of a bell sound output 202-2, a vibration output 202-3 and a notice pop-up window 202-1.

If a predetermined command is received from the user of the sender terminal 100-1 through the sender terminal 100-1, the reception terminal 100-2 may change at least one output of the bell sound output 202-2, the vibration output 202-3 and the notice pop-up window 202-1.

That is, according to the above-described embodiment, the user of the reception terminal 100-2 may know that the user of the sender terminal 100-1 push the answer of the call signal.

In one embodiment of the present invention, it is suggested to transfer a voice of the sender party as a method for pushing the answer of the call signal. This embodiment will be described with reference to FIG. 7.

Figure 7:
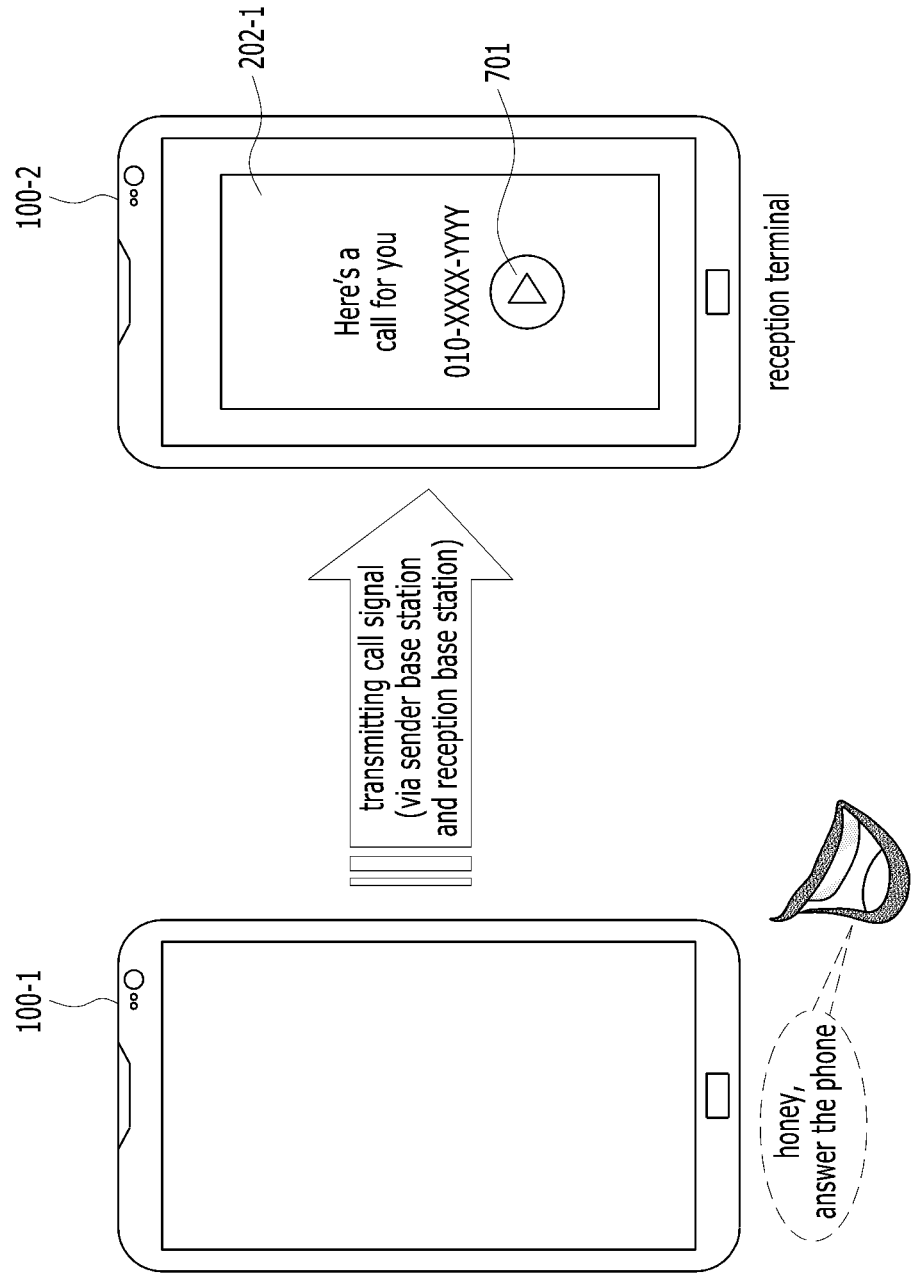
FIGS. 7 and 8 are views illustrating a control method for transferring a voice message from a sender terminal 100-1 to a reception terminal 100-2 in accordance with one embodiment of the present invention.
Figure 8:
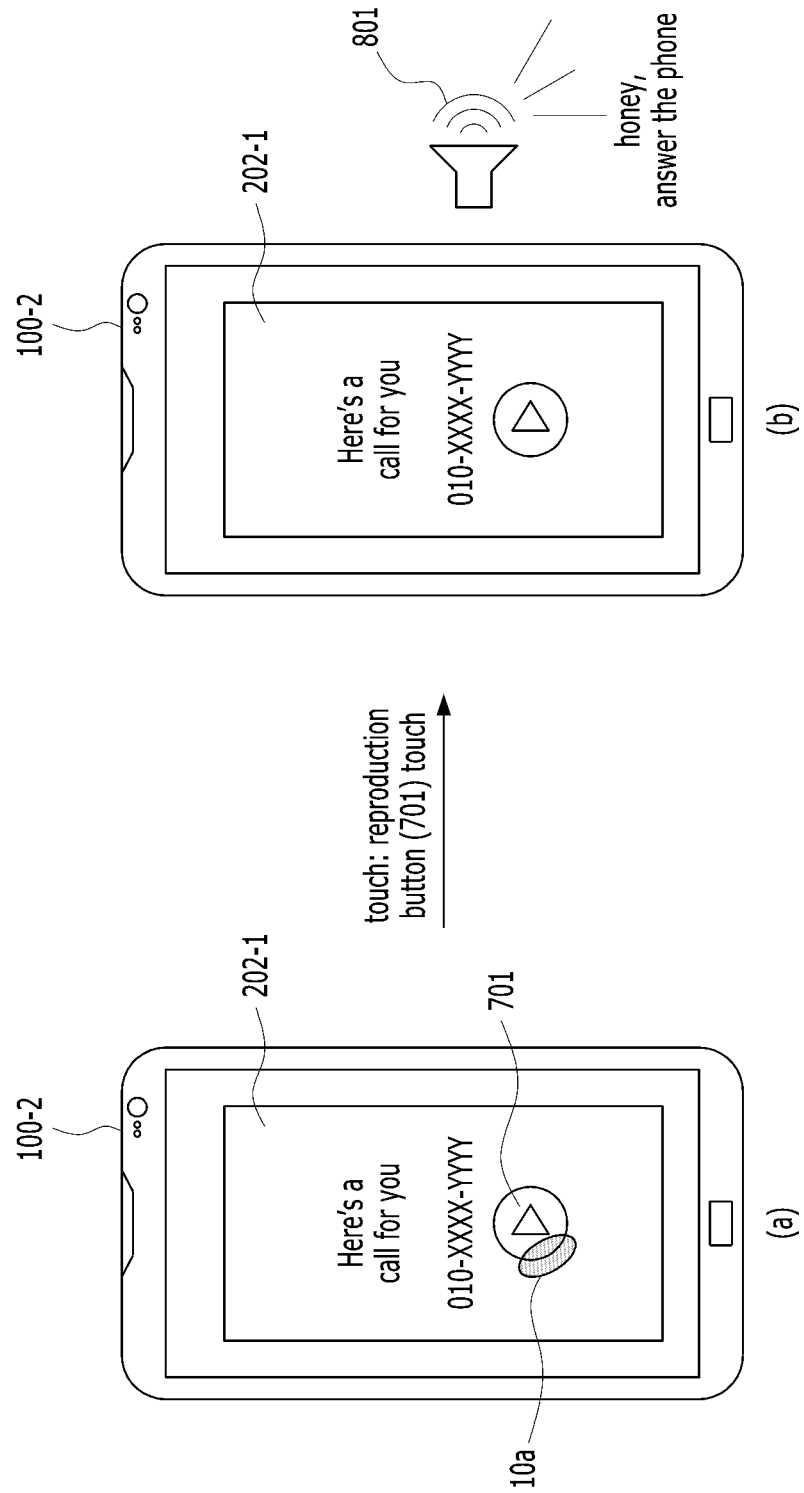

FIGS. 7 and 8 are views illustrating a control method for transferring a voice message from a sender terminal 100-1 to a reception terminal 100-2 in accordance with one embodiment of the present invention.

Referring to FIG. 7, the call signal is transmitted from the sender terminal 100-1 to the reception terminal 100-2. In this case, as described above, the reception terminal 100-2 may notify the user of the reception terminal 100-2 that the call signal is being received, by outputting at least one of the bell sound output 202-2, the vibration output 202-3 and the notice pop-up window 202-1. Moreover, in one embodiment of the present invention, it is suggested that a voice message is transferred to the sender terminal 100-1 if the voice message is received in the reception terminal 100-2.

The reception terminal 100-2, which has received the voice message, may output the received voice message, or may output a button 701 (hereinafter, referred to as a voice reproduction button) for reproducing the voice message.

If an input 10a to select the voice reproduction button 701 is received, the controller 180 of the reception terminal 100-2 may output the voice message (801).

Meanwhile, the control method for configuring the melody using basic tonality or basic chord has been described in the aforementioned embodiment described with reference to FIG. 4 and Table 1.

Furthermore, in one embodiment of the present invention, it is suggested to generate an individual melody having various tonalities, chord progressions and rhythm patterns in generating the individual melody on the basis of a sender identification number (i.e., sender phone number). This embodiment will be described with reference to FIGS. 9 and 10.

Figure 9:
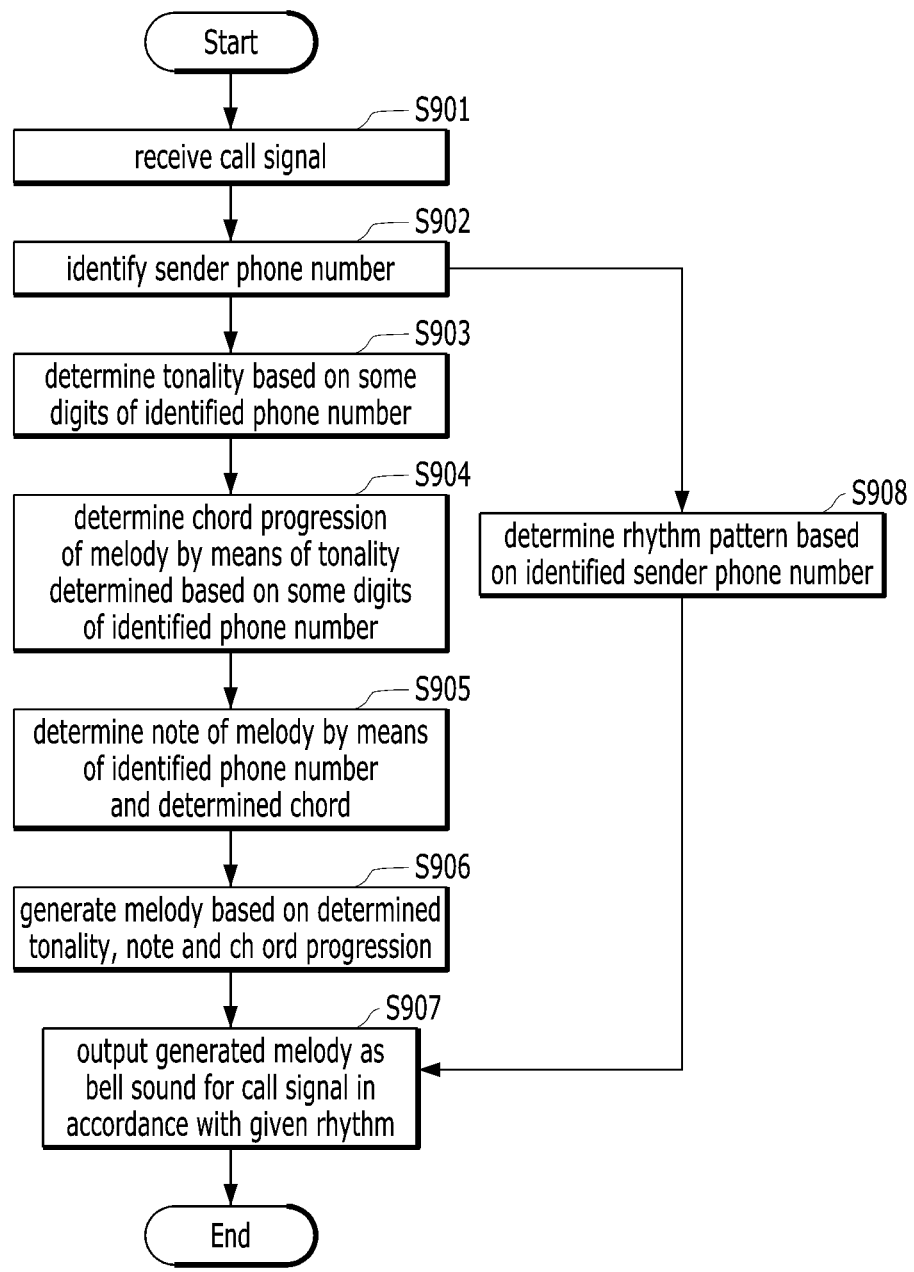
FIG. 9 is a flow chart illustrating a control method for determining tonality, chord and tone based on a sender phone number and generating a melody based on the determined result in accordance with one embodiment of the present invention.
Figure 10:
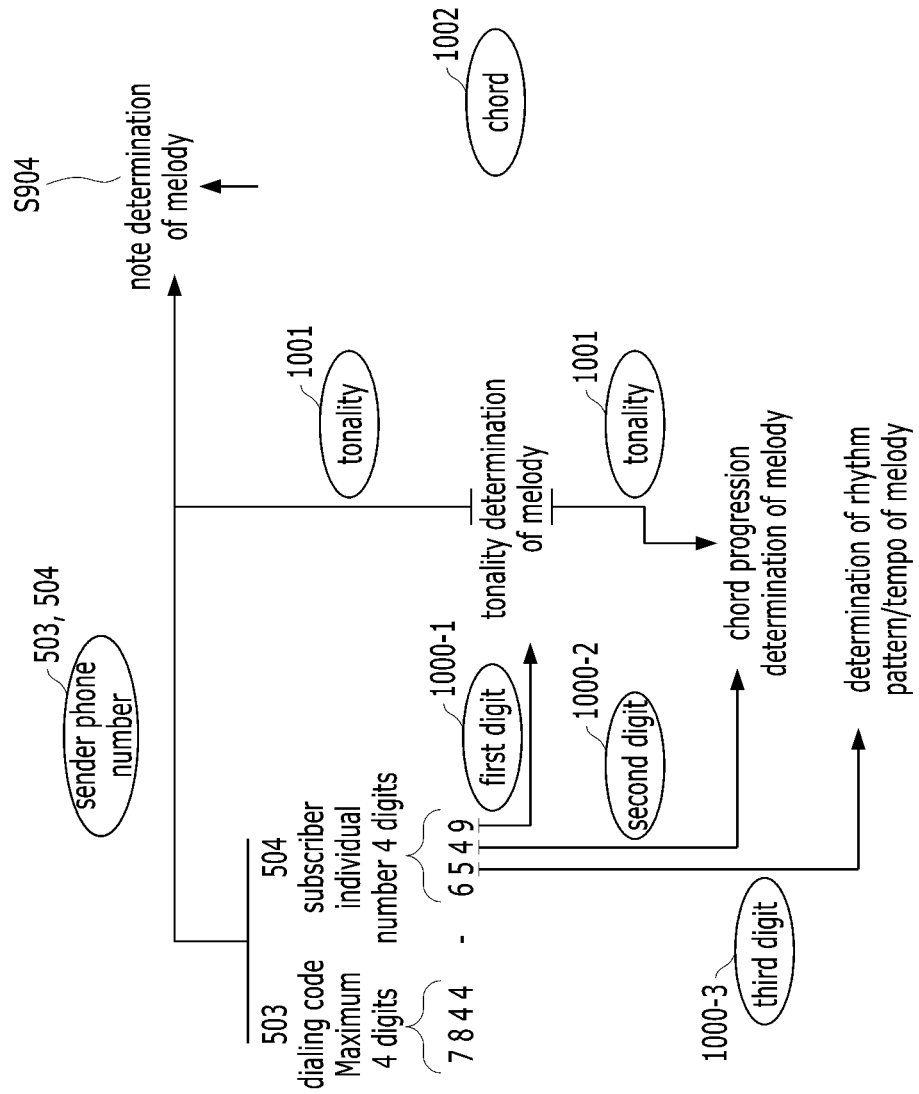
FIG. 10 is a view illustrating an example of determining tonality, chord and tone based on a sender phone number and generating a melody based on the determined result in accordance with one embodiment of the present invention.

FIG. 9 is a flow chart illustrating a control method for determining tonality, chord, and tone based on a sender phone number and generating a melody based on the determined result in accordance with one embodiment of the present invention. FIG. 10 is a view illustrating an example of determining tonality, chord and tone based on a sender phone number and generating a melody based on the determined result in accordance with one embodiment of the present invention. Hereinafter, description will be made with reference to FIGS. 9 and 10.

In step S901, the controller 180 receives the call signal through the wireless communication unit 110. Subsequently, in step S902, the controller 180 may identify the sender phone number of the received call signal.

In step S903, the controller 180 may determine tonality of the melody on the basis of some digits of the identified phone number.

If a harmony or melody used for music has a certain music relation based on one note or one chord, this music will be referred to as music with tonality. Therefore, tonality is a note phenomenon in the course of music, and the presence of tonality of music is determined depending on that the music is under the control of basic note and chord. The basic note will be referred to as a 'keynote', and the basic chord will be referred to as a 'tonic chord'. For example, C major may be expressed directly by the major scale based on C note as a keynote. If composition is made based on the scale, it is likely to make music having tonality based on C note as a keynote.

In the example described with reference to FIG. 10, tonality is determined using some digits of the sender phone number. Particularly, in one embodiment of the present invention, it is suggested to determine tonality using the last digit (first digit 1000-1) of the sender number. Table 2 illustrates a matching information table for determining tonality using the first digit 1000-1 in accordance with one embodiment of the present invention.

TABLE 2

| First digit (1000-1) | Tonality (key) |
|---|---|
| 9 | G Major |
| 8 | F Major |
| 7 | C Major |
| 6 | D Major |
| 5 | E Major |
| 4 | A Major |
| 3 | B Major |
| 2 | $B^b$ Major |

TABLE 2-continued

| First digit (1000-1) | Tonality (key) |
|---|---|
| 1 | E$^b$ Major |
| 0 | A$^b$ Major |

That is, in the example shown in FIG. 10, since the first digit 1000-1 is "9", the first digit 1000-1 may correspond to "G Major" tonality of Table 2.

Therefore, the controller 180 may determine tonality of the melody based on the first digit 1000-1 in step S903.

If tonality is determined in step S903, chord progression S904 for melody accompaniment on the basis of the determined tonality and the sender phone number. Particularly, in the example shown in FIG. 10, chord progression is determined based on the determined tonality and the second digit 1000-2 of the sender phone number.

In one embodiment of the present invention, chord progression means the order of chords repeated during reproduction of the melody. For example, if the "F Major 7th" chord (the first chord) and the "C Major 7th" chord (the second chord) are repeatedly progressed by melody accompaniment, chord progression may be expressed as "F Major 7$^{th}$-C Major 7th". Moreover, in one embodiment of the present invention, it is assumed that two chords are progressed. In this case, a first melody area which is a melody area generated using four digits of the dialing code 503 may be output together with accompaniment of the first chord, and a second melody area which is a melody area generated using the subscriber individual number 504 may be output together with accompaniment of the second chord.

In the example of chord determination according to one embodiment of the present invention, 7th chord progression (dependent upon "Diatonic Scale") in major tonality, which expresses chord progression as Arabic numerals, may be used. Table 3 illustrates an example of chord progression corresponding to the second digit 1000-2.

TABLE 3

| Second digit (1000-2) | Chord progression |
|---|---|
| 0, 1 | ii ? I |
| 2, 3 | iii - V |
| 4, 5 | IV - I |
| 6, 7 | ii ? V |
| 8, 9 | V - I |

In the same manner as the example shown in FIG. 10, if the second digit 1000-2 is "4", chord progression may be determined as tetrachord (IV)-one chord (I). In conclusion, the tonality 1001 determined in the step S903 has been determined as "G Major", and since tetrachord (IV) in "G Major" is "D Major 7th" and one chord (I) is "G Major 7th", chord progression may be repetition of "D Major 7th-G Major 7th". That is, the first melody area may be progressed by "D Major 7th" chord, and the second melody area may be progressed by "G Major 7th" chord.

Subsequently, in step S905, the controller 180 may determine a note of the melody on the basis of the identified sender phone number and the determined chord. The method for determining a note of the melody may correspond to different notes per chord as follows even in case of the same digit, in addition to the aforementioned method described with reference to FIG. 4 and Table 1.

That is, in determining a note of the first melody area using the dialing code 503, the note of the first melody may be determined based on a note configuration table (Table 4) corresponding to "D Major 7th(DM7)".

TABLE 4

| | digit | | | | | | | | | |
|---|---|---|---|---|---|---|---|---|---|---|
| | 0 | 1 | 2 | 3 | 4 | 5 | 6 | 7 | 8 | 9 |
| note | F#3 (66) | A3 (69) | C#4 (73) | D4 (74) | E4 (76) | F#4 (78) | A4 (81) | C#5 (85) | D5 (86) | E5 (88) |

In Table 4, a note corresponding to D4(74) is a chord fundamental note (reference note).

In the example shown in FIG. 10, since the dialing code 503 is "7844", note corresponding to each digit may be progressed in the order of C#5(85)-D5(86)-E4(76)-E4(76) based on Table 4.

That is, in determining the note of the second melody area using the subscriber individual number 504, the note of the second melody area may be determined based on a note configuration table (Table 5) corresponding to "G Major 7th(GM7)".

TABLE 5

| | digit | | | | | | | | | |
|---|---|---|---|---|---|---|---|---|---|---|
| | 0 | 1 | 2 | 3 | 4 | 5 | 6 | 7 | 8 | 9 |
| note | F#3 (66) | G3 (67) | A3 (69) | B3 (71) | D4 (74) | F#4 (78) | G4 (79) | A4 (81) | B4 (83) | D5 (86) |

In the example shown in FIG. 10, since the subscriber individual number 504 is "6549", note corresponding to each digit may be progressed in the order of G4(79)-F#4(78)-D4(74)-D5(86).

The accompaniment of the first melody area corresponding to the dialing code 503 is "D Major 7th(DM7)", and the note of the first melody area may be progressed in the order of C#5(85)-D5(86)-E4(76)-E4(76). The 로진행할수있다. The accompaniment of the second melody area corresponding to the subscriber individual number 504 is "G Major 7th (GM7)", and the note of the second melody area may be progressed in the order of G4(79)-F#4(78)-D4(74)-D5(86). In step S906, a melody which repeatedly progresses the first melody area and the second melody area may be generated.

The above Table 4 and Table 5 are note configuration tables for "D Major 7th(DM7)" and "G Major 7th(GM7)", respectively. The following Tables 6 to 15 sequentially illustrate note configuration tables for natalities "G Major", "F Major", "C Major", "D Major", "E Major", "A Major", "B Major", "Bb Major", "Eb Major" and "Ab Major".

TABLE 6

Note configuration table for G Major tonality

| | digit | | | | | | | | | |
|---|---|---|---|---|---|---|---|---|---|---|
| | 0 | 1 | 2 | 3 | 4 | 5 | 6 | 7 | 8 | 9 |
| GM71th (I) | F#3 (66) | G3 (67) | A3 (69) | B3 (71) | D4 (74) | F#4 (78) | G4 (79) | A4 (81) | B4 (83) | D5 (86) |
| Am72th (ii) | E3 (64) | G3 (67) | A3 (69) | C4 (72) | E4 (76) | G4 (79) | A4 (81) | B4 (83) | C5 (84) | E5 (88) |
| Bm73th (iii) | D3 (62) | F#3 (66) | A3 (69) | B3 (71) | D4 (74) | F#4 (78) | A4 (81) | B4 (83) | C#4 (85) | D5 (86) |
| CM74th (IV) | E3 (64) | G3 (67) | B3 (71) | C4 (72) | D4 (74) | E4 (76) | G4 (79) | B4 (83) | C5 (84) | D5 (86) |
| D75th (V) | E3 (64) | F#3 (66) | A3 (69) | C4 (72) | D4 (74) | E4 (76) | F#4 (78) | A4 (81) | C5 (84) | D5 (86) |

TABLE 7

Note configuration table for F Major tonality

| | digit | | | | | | | | | |
|---|---|---|---|---|---|---|---|---|---|---|
| | 0 | 1 | 2 | 3 | 4 | 5 | 6 | 7 | 8 | 9 |
| FM71th (I) | F3 (65) | G3 (67) | A3 (69) | C4 (72) | E4 (76) | F4 (77) | G4 (79) | A4 (81) | C5 (84) | E5 (88) |
| Gm72th (ii) | D3 (62) | F3 (65) | G3 (67) | B♭3 (70) | D4 (74) | F4 (77) | G4 (79) | A4 (81) | B♭4 (82) | D5 (86) |
| Am73th (iii) | E3 (64) | G3 (67) | A3 (69) | C4 (72) | E4 (76) | G4 (79) | A4 (81) | B4 (83) | C5 (84) | E5 (88) |
| B♭M74th (IV) | F3 (65) | A3 (69) | B♭3 (70) | C4 (72) | D4 (74) | F4 (77) | A4 (81) | B♭4 (82) | C5 (84) | D5 (86) |
| C75th(V) | E3 (64) | G3 (67) | B♭3 (70) | C4 (72) | D4 (74) | E4 (76) | G4 (79) | B♭4 (82) | C5 (84) | D5 (86) |

TABLE 8

Note configuration table for C Major tonality

| | digit | | | | | | | | | |
|---|---|---|---|---|---|---|---|---|---|---|
| | 0 | 1 | 2 | 3 | 4 | 5 | 6 | 7 | 8 | 9 |
| CM71th (I) | E3 (64) | G3 (67) | B3 (71) | C4 (72) | D4 (74) | E4 (76) | G4 (79) | B4 (83) | C5 (84) | D5 (86) |
| Dm72th (ii) | D3 (62) | F3 (65) | A3 (69) | C4 (72) | D4 (74) | E4 (76) | F4 (77) | A4 (81) | C5 (84) | D5 (86) |
| Em73th (iii) | E3 (64) | G3 (67) | B3 (71) | D4 (74) | E4 (76) | F#4 (78) | G4 (79) | B4 (83) | D5 (86) | E5 (88) |
| FM74th (IV) | F3 (65) | G3 (67) | A3 (69) | C4 (72) | E4 (76) | F4 (77) | G4 (79) | A4 (81) | C5 (84) | E5 (88) |
| G75th(V) | F3 (65) | G3 (67) | A3 (69) | B3 (71) | D4 (74) | F4 (77) | G4 (79) | A4 (81) | B4 (83) | D5 (86) |

TABLE 9

Note configuration table for D Major tonality

| | digit | | | | | | | | | |
|---|---|---|---|---|---|---|---|---|---|---|
| | 0 | 1 | 2 | 3 | 4 | 5 | 6 | 7 | 8 | 9 |
| DM71th (I) | F#3 (66) | A3 (69) | C#4 (73) | D4 (74) | E4 (76) | F#4 (78) | A4 (81) | C#5 (85) | D5 (86) | E5 (88) |

TABLE 9-continued

Note configuration table for D Major tonality

| | digit | | | | | | | | | |
|---|---|---|---|---|---|---|---|---|---|---|
| | 0 | 1 | 2 | 3 | 4 | 5 | 6 | 7 | 8 | 9 |
| Em72th (ii) | E3 (64) | G3 (67) | B3 (71) | D4 (74) | E4 (76) | F#4 (78) | G4 (79) | B4 (83) | D5 (86) | E5 (88) |
| F#m73th (iii) | E3 (64) | F#3 (66) | A3 (69) | C#4 (73) | E4 (76) | F#4 (78) | G#4 (80) | A4 (81) | C#5 (85) | E5 (88) |
| GM74th (IV) | F#3 (66) | G3 (67) | A3 (69) | B3 (71) | D4 (74) | F#4 (78) | G4 (79) | A4 (81) | B4 (83) | D5 (86) |
| A7 5th(V) | G3 (67) | A3 (69) | B3 (71) | C#4 (73) | E4 (76) | G4 (79) | A4 (81) | B4 (83) | C#5 (85) | E5 (88) |

TABLE 10

Note configuration table for E Major tonality

| | digit | | | | | | | | | |
|---|---|---|---|---|---|---|---|---|---|---|
| | 0 | 1 | 2 | 3 | 4 | 5 | 6 | 7 | 8 | 9 |
| EM71th (I) | F#3 (66) | G#3 (68) | B3 (71) | D#4 (75) | E4 (76) | F#4 (78) | G#4 (80) | B4 (83) | D#5 (87) | E5 (88) |
| F#m72th (ii) | E3 (64) | F#3 (66) | A3 (69) | C#4 (73) | E4 (76) | F#4 (78) | G#4 (80) | A4 (81) | C#5 (85) | E5 (88) |
| G#m73th (iii) | D#3 (63) | F#3 (66) | G#3 (68) | B3 (71) | D#4 (75) | F#4 (78) | G#4 (80) | A#4 (82) | B4 (83) | D#5 (87) |
| AM74th (IV) | G#3 (68) | A3 (69) | B3 (71) | C#4 (73) | E4 (76) | G#4 (80) | A4 (81) | B4 (83) | C#5 (85) | E5 (88) |
| B75th (V) | F#3 (66) | A3 (69) | B3 (71) | C#4 (73) | D#4 (75) | F#4 (78) | A4 (81) | B4 (83) | C#5 (85) | D#5 (87) |

TABLE 11

Note configuration table for A Major tonality

| | digit | | | | | | | | | |
|---|---|---|---|---|---|---|---|---|---|---|
| | 0 | 1 | 2 | 3 | 4 | 5 | 6 | 7 | 8 | 9 |
| AM71th (I) | G#3 (68) | A3 (69) | B3 (71) | C#4 (73) | E4 (76) | G#4 (80) | A4 (81) | B4 (83) | C#5 (85) | E5 (88) |
| Bm72th (ii) | D3 (62) | F#3 (66) | A3 (69) | B3 (71) | D4 (74) | F#4 (78) | A4 (81) | B4 (83) | C#5 (85) | D5 (86) |
| C#m73th (iii) | E3 (64) | G#3 (68) | B3 (71) | C#4 (73) | E4 (76) | G#4 (80) | B4 (83) | C#5 (85) | D#5 (87) | E5 (88) |
| DM74th (IV) | F#3 (66) | A3 (69) | C#4 (73) | D4 (74) | E4 (76) | F#4 (78) | A4 (81) | C#5 (85) | D5 (86) | E5 (88) |
| E75th (V) | F#3 (66) | G#3 (68) | B3 (71) | D4 (74) | E4 (76) | F#4 (78) | G#4 (80) | B4 (83) | D5 (86) | E5 (88) |

TABLE 12

Note configuration table for B Major tonality

| | digit | | | | | | | | | |
|---|---|---|---|---|---|---|---|---|---|---|
| | 0 | 1 | 2 | 3 | 4 | 5 | 6 | 7 | 8 | 9 |
| BM71th (I) | F#3 (66) | A#3 (70) | B3 (71) | C#4 (73) | D#4 (75) | F#4 (78) | A#4 (82) | B4 (83) | C#5 (85) | D#5 (87) |
| C#m72th (ii) | E3 (64) | G#3 (68) | B3 (71) | C#4 (73) | E4 (76) | G#4 (80) | B4 (83) | C#5 (85) | D#5 (87) | E5 (88) |
| D#m73th (iii) | D#3 (63) | F#3 (66) | A#3 (70) | C#4 (73) | D#4 (75) | E#4 (77) | F#4 (78) | A#4 (82) | C#5 (85) | D#5 (87) |
| EM74th (IV) | F#3 (66) | G#3 (68) | B3 (71) | D#4 (75) | E4 (76) | F#4 (78) | G#4 (80) | B4 (83) | D#5 (87) | E5 (88) |
| F#75th (V) | F#3 (66) | G#3 (68) | A#3 (70) | C#4 (73) | E4 (76) | F#4 (78) | G#4 (80) | A#4 (82) | C#5 (85) | E5 (88) |

TABLE 13

Note configuration table for B$^b$ Major tonality

| | digit | | | | | | | | | |
|---|---|---|---|---|---|---|---|---|---|---|
| | 0 | 1 | 2 | 3 | 4 | 5 | 6 | 7 | 8 | 9 |
| B$^b$M71th (I) | F3 (65) | A3 (69) | B$^b$3 (70) | C4 (72) | D4 (74) | F4 (77) | A4 (81) | B$^b$4 (82) | C5 (84) | D5 (86) |
| Cm72th (ii) | E$^b$3 (63) | G3 (67) | B$^b$3 (70) | C4 (72) | E$^b$4 (75) | G4 (79) | B$^b$4 (82) | C5 (84) | D5 (86) | E$^b$5 (87) |
| Dm73th (iii) | D3 (62) | F3 (65) | A3 (69) | C4 (72) | D4 (74) | E4 (76) | F4 (77) | A4 (81) | C5 (84) | D5 (86) |
| E$^b$M74th (IV) | F3 (65) | G3 (67) | B$^b$3 (70) | D4 (74) | E$^b$4 (75) | F4 (77) | G4 (79) | B$^b$4 (82) | D5 (86) | E$^b$5 (87) |
| F75th (V) | F3 (65) | G3 (67) | A3 (69) | C4 (72) | E$^b$4 (75) | F4 (77) | G4 (79) | A4 (81) | C5 (84) | E$^b$5 (87) |

TABLE 14

Note configuration table for E$^b$ Major tonality

| | digit | | | | | | | | | |
|---|---|---|---|---|---|---|---|---|---|---|
| | 0 | 1 | 2 | 3 | 4 | 5 | 6 | 7 | 8 | 9 |
| E$^b$M71th (I) | F3 (65) | G3 (67) | B$^b$3 (70) | D4 (74) | E$^b$4 (75) | F4 (77) | G4 (79) | B$^b$4 (82) | D5 (86) | E$^b$5 (87) |
| Fm72th (ii) | E$^b$3 (63) | F3 (65) | A$^b$3 (68) | C4 (72) | E$^b$4 (75) | F4 (77) | G4 (79) | A$^b$4 (80) | C5 (84) | E$^b$5 (87) |
| Gm73th (iii) | D3 (62) | F3 (65) | G3 (67) | B$^b$3 (70) | D4 (74) | F4 (77) | G4 (79) | A4 (81) | B$^b$4 (82) | D5 (86) |
| A$^b$M74th (IV) | G3 (67) | A$^b$3 (68) | B$^b$3 (70) | C4 (72) | E$^b$4 (75) | G4 (79) | A$^b$4 (80) | B$^b$4 (82) | C5 (84) | E$^b$5 (87) |
| B$^b$75th (V) | F3 (65) | A$^b$3 (68) | B$^b$3 (70) | C4 (72) | D4 (74) | F4 (77) | A$^b$4 (80) | B$^b$4 (82) | C5 (84) | D5 (86) |

TABLE 15

Note configuration table for A$^b$ Major tonality

| | Digit | | | | | | | | | |
|---|---|---|---|---|---|---|---|---|---|---|
| | 0 | 1 | 2 | 3 | 4 | 5 | 6 | 7 | 8 | 9 |
| A$^b$M71th (I) | G3 (67) | A$^b$3 (68) | B$^b$3 (70) | C4 (72) | E$^b$4 (75) | G4 (79) | A$^b$4 (80) | B$^b$4 (82) | C5 (84) | E$^b$5 (87) |
| B$^b$m72th (ii) | D$^b$3 (61) | F3 (65) | A$^b$3 (68) | B$^b$3 (70) | D$^b$4 (73) | F4 (77) | A$^b$4 (80) | B$^b$4 (82) | C5 (84) | D$^b$5 (85) |
| Cm73th (iii) | E$^b$3 (63) | G3 (67) | B$^b$3 (70) | C4 (72) | E$^b$4 (75) | G4 (79) | B$^b$4 (82) | C5 (84) | D5 (86) | E$^b$5 (87) |
| D$^b$M74th (IV) | F3 (65) | A$^b$3 (68) | C4 (72) | D$^b$4 (73) | E$^b$4 (75) | F4 (77) | A$^b$4 (80) | C5 (84) | D$^b$5 (85) | E$^b$5 (87) |
| E$^b$75th (V) | F3 (65) | G3 (67) | B$^b$3 (70) | D$^b$4 (73) | E$^b$4 (75) | F4 (77) | G4 (79) | B$^b$4 (82) | D$^b$5 (85) | E$^b$5 (87) |

The following Table 16 illustrates a chord accompaniment configuration table.

TABLE 16

| | configuration note | | | |
|---|---|---|---|---|
| chord | First note | Third note | Fifth note | Seventh note |
| CM7 | C2(48) | E2(52) | G2(55) | B2(59) |
| C7 | C2(48) | E2(52) | G2(55) | B$^b$2(58) |
| Cm7 | C2(48) | E$^b$2(51) | G2(55) | B$^b$2(58) |
| C$^#$M7(D$^b$M7) | C$^#$2(49) | E$^#$2(53) | G$^#$2(56) | B$^#$2(60) |
| C$^#$7(D$^b$7) | C$^#$2(49) | E$^#$2(53) | G$^#$2(56) | B2(59) |
| C$^#$m7(D$^b$m7) | C$^#$2(49) | E2(52) | G$^#$2(56) | B2(59) |
| DM7 | D2(50) | F$^#$2(54) | A2(57) | C$^#$3(61) |
| D7 | D2(50) | F$^#$2(54) | A2(57) | C3(60) |
| Dm7 | D2(50) | F2(53) | A2(57) | C3(60) |

TABLE 16-continued

| chord | First note | Third note | Fifth note | Seventh note |
|---|---|---|---|---|
| $D^\#M7(E^bM7)$ | $D^\#2/E^b2(51)$ | $F^\times 2/G2(55)$ | $A^\#2/B^b2(58)$ | $E^\times 2/D3(62)$ |
| $D^\#7(E^b7)$ | $D^\#2/E^b2(51)$ | $F^\times 2/G2(55)$ | $A^\#2/B^b2(58)$ | $E^\#2/D^b3(61)$ |
| $D^\#m7(E^bm7)$ | $D^\#2/E^b2(51)$ | $F^\#2/G^b2(54)$ | $A^\#2/B^b2(58)$ | $E^\#2/D^b3(61)$ |
| EM7 | E2(52) | $G^\#2(56)$ | B2(59) | $D^\#3(63)$ |
| E7 | E2(52) | $G^\#2(56)$ | B2(59) | D3(62) |
| Em7 | E2(52) | G2(55) | B2(59) | D3(62) |
| FM7 | F2(53) | A2(57) | C3(60) | E3(64) |
| F7 | F2(53) | A2(57) | C3(60) | $E^b3(63)$ |
| Fm7 | F2(53) | $A^b2(56)$ | C3(60) | $E^b3(63)$ |
| $F^\#M7$ | $F^\#2(54)$ | $A^\#2(58)$ | $C^\#3(61)$ | $E^\#3(65)$ |
| $F^\#7$ | $F^\#2(54)$ | $A^\#2(58)$ | $C^\#3(61)$ | E3(64) |
| $F^\#m7$ | $F^\#2(54)$ | A2(57) | $C^\#3(61)$ | E3(64) |
| GM7 | G1(43) | B1(47) | D2(50) | $F^\#2(54)$ |
| G7 | G1(43) | B1(47) | D2(50) | F2(53) |
| Gm7 | G1(43) | $B^b1(46)$ | D2(50) | F2(53) |
| $G^\#M7(A^bM7)$ | $G^\#1(44)$ | $B^\#1(48)$ | $D^\#2(51)$ | $F^\times 2(55)$ |
| $G^\#7(A^b7)$ | $G^\#1(44)$ | $B^\#1(48)$ | $D^\#2(51)$ | $F^\#2(54)$ |
| $G^\#m7(A^bm7)$ | $G^\#1(44)$ | B1(47) | $D^\#2(51)$ | $F^\#2(54)$ |
| AM7 | A1(45) | $C^\#2(49)$ | E2(52) | $G^\#2(56)$ |
| A7 | A1(45) | $C^\#2(49)$ | E2(52) | G2(55) |
| Am7 | A1(45) | C2(48) | E2(52) | G2(55) |
| $B^bM7$ | B1(46) | D2(50) | F2(53) | A2(57) |
| $B^b7$ | B1(46) | D2(50) | F2(53) | $A^b2(56)$ |
| $B^bm7$ | B1(46) | $D^b2(49)$ | F2(53) | $A^b2(56)$ |
| BM7 | B1(47) | $D^\#2(51)$ | $F^\#2(54)$ | $A^\#2(58)$ |
| B7 | B1(47) | $D^\#2(51)$ | $F^\#2(54)$ | A2(57) |
| Bm7 | B1(47) | D2(50) | $F^\#2(54)$ | A2(57) |

Returning to the flow chart of FIG. 9 again, the controller 180 may determine a rhythm pattern on the basis of the identified sender phone number (S908).

In step S907, the controller 180 may output the generated melody as a bell sound in accordance with the determined rhythm pattern/tempo to correspond to the received call signal.

According to one embodiment of the present invention, as shown in FIG. 10, it is suggested to determine the rhythm pattern/tempo of the melody on the basis of the third digit 1000-3 of the identified sender phone number.

According to one embodiment of the present invention, the rhythm pattern may be changed based on whether the identified sender phone number is stored in an address list, whether the identified sender phone number is a frequently contact history, and whether the identified sender phone number is registered in a bookmark. This embodiment will be described in detail with reference to FIG. 11.

Figure 11:
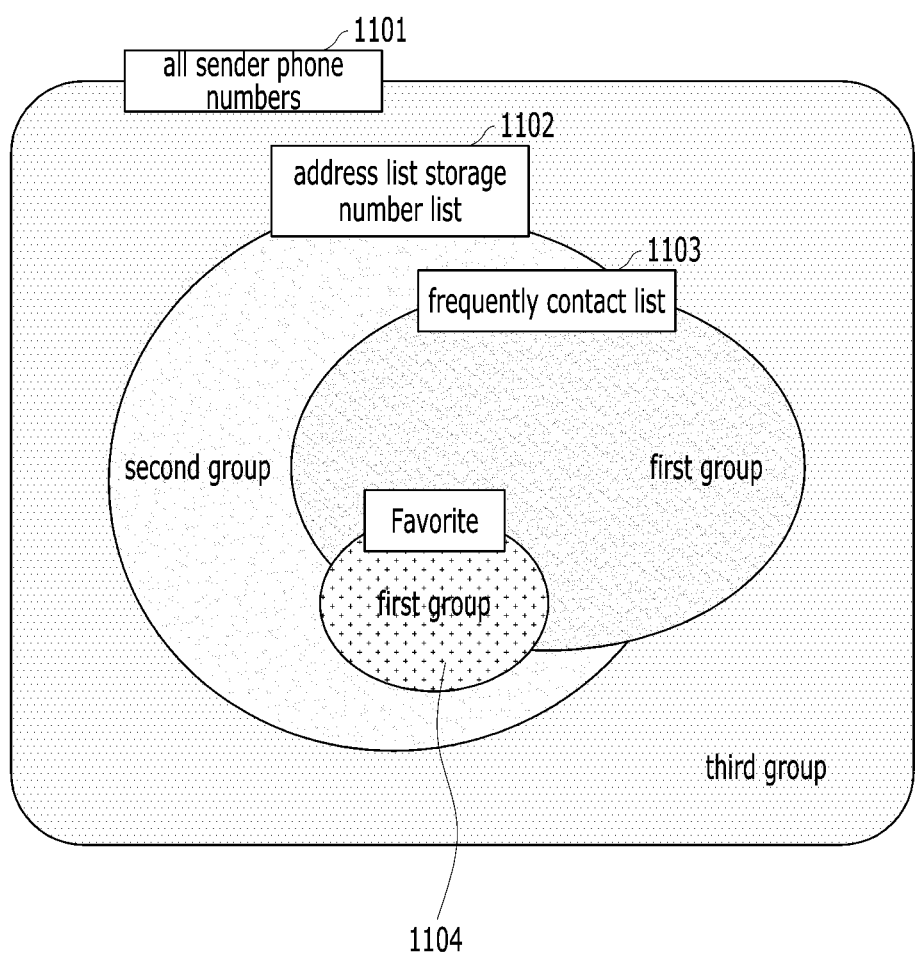
FIG. 11 is a Venn diagram of a sender phone number group identified in accordance with one embodiment of the present invention.

FIG. 11 is a Venn diagram of a sender phone number group identified in accordance with one embodiment of the present invention.

All sender phone numbers may be categorized into an address list storage number list 1102 managed by being previously stored in the mobile terminal 100 and a number list (other than the list 1102) which is not stored in the address list. The address list storage number list 1102 may be categorized into a bookmark number list 1104 bookmarked by the user and a number list which is not registered.

Also, all the sender phone numbers may be categorized into a frequently contact phone number list 1103 and a non-frequently contact phone number list (other than the list 1103).

According to one embodiment of the present invention, it is suggested to determine the rhythm pattern/tempo in accordance with the group of the identified sender phone numbers.

For example, a list of the sender phone numbers (union of 1103 and 1104), which belong to the frequently contact phone number list 1103 and the bookmark number list 1104, may be classified into a first group, the phone numbers which do not belong to the bookmark phone number list 1104 of the address list storage number list 1102 may be classified into a second group (intersection of complementary set of 1102 and complementary set of 1103), and the phone numbers which do not belong to the first and second groups may be classified into a third group, whereby different rhythm patterns/tempos may be applied.

Figure 12:
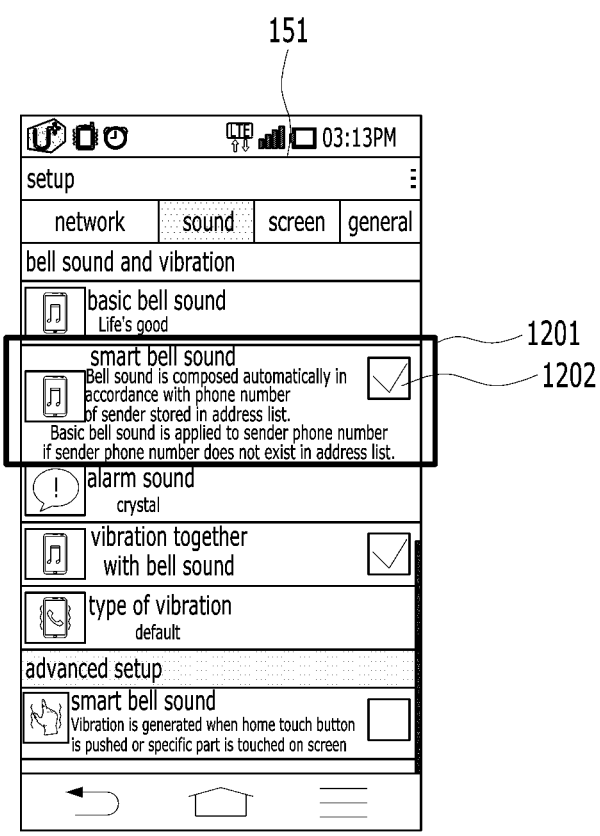
FIG. 12 is a view illustrating a user interface screen for activating a bell sound according to one embodiment of the present invention.

FIG. 12 is a view illustrating a user interface screen for activating a bell sound according to one embodiment of the present invention.

FIG. 12 illustrates a user interface screen for setting a sound output through the touch screen 151. In one embodiment of the present invention, it is suggested to activate/deactivate (set/release check box 1202) an item 1201, 'smart bell sound' for outputting a bell sound generated by identifying a 'sender phone number', through the sound setup screen of the mobile terminal 100.

Figure 13:
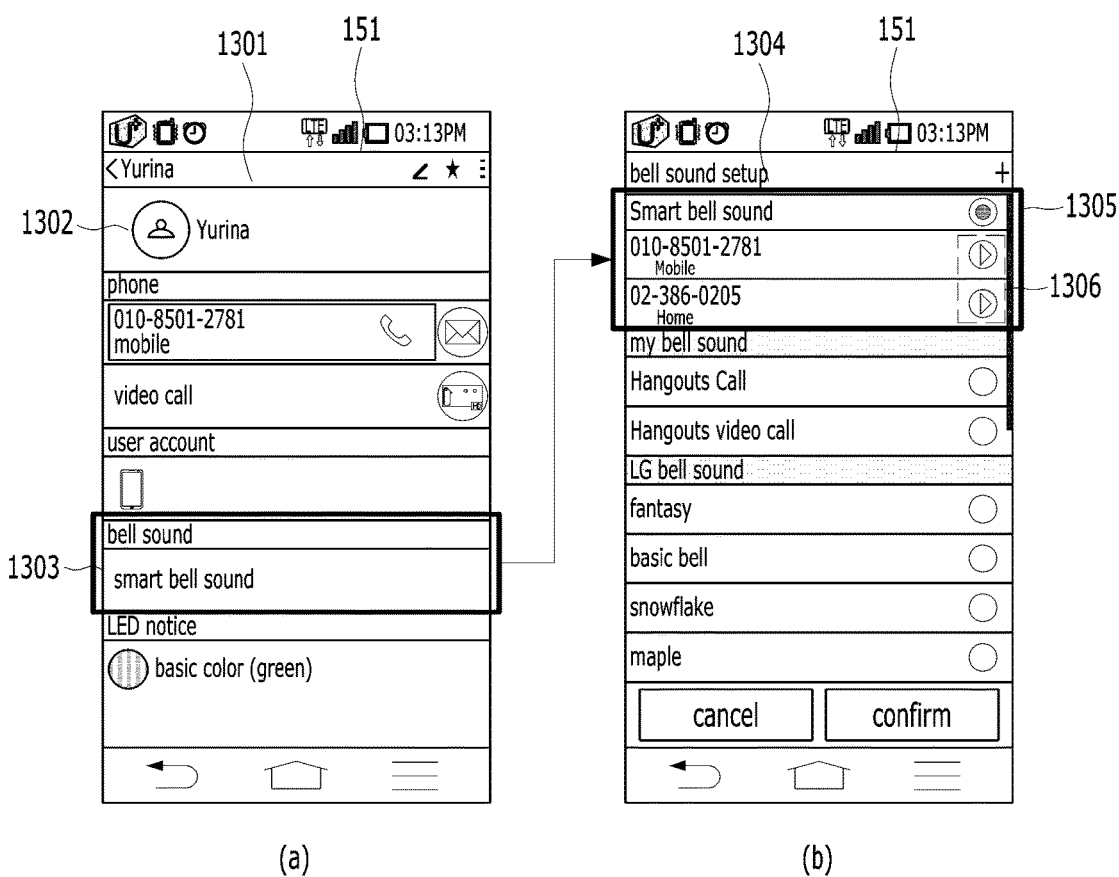
FIG. 13 is a state view illustrating a control method for setting a bell sound per user in accordance with one embodiment of the present invention.

FIG. 13 is a state view illustrating a control method for setting a bell sound per user in accordance with one embodiment of the present invention.

Referring to FIG. 13(a), the controller 180 outputs a setup screen 1301 for setting a bell sound per contact other party, through the touch screen 151. The setup screen 1301 in the shown example is a setup screen for a bell sound of a contact other party depicted as Yurina 1302.

If an input to touch a bell sound setup item 1303 is received, as shown in FIG. 13(b), the controller 180 outputs a bell sound setup screen 1304 for setting a bell sound for a contact other party depicted as Yurina 1302.

At this time, when a 'smart bell sound' item 1305 is selected, the controller may output the melody generated in accordance with one embodiment of the present invention as a bell sound if a call signal is received from the corresponding contact other party.

Also, when a bell sound reproduction button 1306 is selected, the controller 180 may output pre-listening of the melody.

The above-described present invention may be implemented in a medium in which a program is recorded, as a code that can be read by a computer. Example of the medium that can be read by a computer include an HDD (hard disk drive), an SSD (solid state disk), an SDD (silicon disk drive), a ROM, a RAM, a CD-ROM, a magnetic tape, a floppy disk, and an optical data storage unit. Also, another example of the recording medium may be implemented in a type of carrier wave (for example, transmission through Internet). Also, the computer may include the controller of the mobile terminal. Thus, the above detailed description is to be considered in all respects as illustrative and not restrictive. The scope of the present invention should be determined by reasonable interpretation of the appended claims and all changes which come within the equivalent scope of the invention are included in the scope of the invention.

The invention claimed is:

1. A mobile terminal comprising:
a wireless communication unit;
an output unit for outputting a bell sound; and
a controller configured to:
receive a call signal through the wireless communication unit,
detect a sender phone number of the received call signal, wherein the sender phone number includes a communication network identification number, a dialing code and a subscriber individual number,
designate a tempo of a melody based on the communication network identification number determined by a first digit string of the sender phone number,
designate a note of the melody determined by the dialing code and the subscriber individual number determined by a second digit string of the sender phone number,
designate a tone of the melody determined by a call frequency from the sender,
determine the melody by combining the designated tempo, the designated note, the designated tone and a chord, and
control the output unit to output a bell sound comprising the melody, wherein the melody includes a plurality of notes,
wherein a tonality of the melody corresponds to a first digit included in the sender phone number,
wherein the dialing code is a number indicating an office name of a telephone exchange office,
wherein the subscriber individual number is comprised of four digits unique to the sender, and
wherein the chord of the melody is determined by a second digit of the subscriber individual number and the tone of the melody.

2. The mobile terminal according to claim 1, wherein the plurality of notes, which configure the melody, are classified into a first melody area corresponding to the dialing code and a second melody area corresponding to the subscriber individual number.

3. The mobile terminal according to claim 2, wherein the chord of the melody includes a first chord of the first melody area and a second chord of the second melody area.

4. The mobile terminal according to claim 1, wherein the first digit is the last digit of the identified sender phone number.

5. The mobile terminal according to claim 1, wherein a rhythm pattern of the melody corresponds to a third digit of the sender phone number.

6. The mobile terminal according to claim 5, further comprising a memory configured to store at least one phone number,
wherein the rhythm pattern of the melody corresponds to whether the sender phone number belongs to any one or more of 1) a phone number group of which use frequency is a predetermined number of times or more, 2) a phone number group previously stored in the memory, and 3) a phone number group bookmarked by a user.

7. The mobile terminal according to claim 1, wherein the tone of the melody is further designated based on the communication network identification number.

8. The mobile terminal according to claim 1, wherein the output unit further outputs a vibration feedback, and the controller is further configured to cause the output unit to output a vibration pattern corresponding to the sender phone number to correspond to reception of the call signal.

9. A control method of a mobile terminal, the control method comprising the steps of:
identifying a sender phone number of a call signal received through a wireless communication unit, wherein the sender phone number includes a communication network identification number, a dialing code and a subscriber individual number;
designating a tempo of a melody based on the communication network identification number determined by a first digit string of the sender phone number;
designating a note of the melody determined by the dialing code and the subscriber individual number determined by a second digit string of the sender phone number;
designating a tone of the melody determined by a call frequency from the sender;
determining the melody by combining the designated tempo, the designated note, the designated tone and a chord; and
outputting a bell sound comprising the melody, wherein the melody includes a plurality of notes,
wherein a tonality of the melody corresponds to a first digit included in the sender phone number,
wherein the dialing code is a number indicating an office name of a telephone exchange office,
wherein the subscriber individual number is comprised of four digits unique to the sender, and
wherein the chord of the melody is determined by a second digit of the subscriber individual number and the tone of the melody.

10. The control method according to claim 9, wherein the plurality of notes, which configure the melody, are classified into a first melody area corresponding to the dialing code and a second melody area corresponding to the subscriber individual number.

11. The control method according to claim 10, wherein the chord of the melody includes a first chord of the first melody area and a second chord of the second melody area.

12. The control method according to claim 9, wherein the first digit is the last digit of the identified sender phone number.

13. The control method according to claim 9, wherein a rhythm pattern of the melody corresponds to a third digit included in the sender phone number.

14. The control method according to claim 13, further comprising storing at least one phone number, wherein the rhythm pattern of the melody corresponds to whether the sender phone number belongs to any one or more of 1) a phone number group of which use frequency is a predetermined number of times or more, 2) a phone number group previously stored in a memory, and 3) a phone number group bookmarked by a user.

15. The control method according to claim 9, wherein the tone of the melody is further designed by the communication network identification number.

16. The control method according to claim 9, further comprising the step of outputting a vibration pattern determined by at least one of the subscriber individual number, the communication network identification number, the subscriber individual number, a local identification number and the dialing code.

* * * * *